United States Patent
Qian

(10) Patent No.: US 12,122,383 B2
(45) Date of Patent: Oct. 22, 2024

(54) AUTONOMOUS-DRIVING-BASED CONTROL METHOD AND APPARATUS, VEHICLE, AND RELATED DEVICE

(71) Applicant: Tencent Technology (Shenzhen) Company Limited, Shenzhen (CN)

(72) Inventor: Xiangjun Qian, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 246 days.

(21) Appl. No.: 17/972,426

(22) Filed: Oct. 24, 2022

(65) Prior Publication Data

US 2023/0037367 A1    Feb. 9, 2023

Related U.S. Application Data

(63) Continuation of application No. PCT/CN2021/127867, filed on Nov. 1, 2021.

(30) Foreign Application Priority Data

Nov. 19, 2020    (CN) .......................... 202011300553.0

(51) Int. Cl.
*B60W 30/18* (2012.01)
*B60W 30/09* (2012.01)
(Continued)

(52) U.S. Cl.
CPC ...... *B60W 30/18163* (2013.01); *B60W 30/09* (2013.01); *B60W 30/0956* (2013.01);
(Continued)

(58) Field of Classification Search
CPC .......... B60W 30/18163; B60W 30/09; B60W 30/0956; B60W 30/12; B60W 30/143;
(Continued)

(56) References Cited

U.S. PATENT DOCUMENTS

2010/0228419 A1    9/2010 Lee et al.
2018/0057002 A1*   3/2018 Lee .................. B60W 60/0015
(Continued)

FOREIGN PATENT DOCUMENTS

CN    107433946 A    12/2017
CN    107901909 A     4/2018
(Continued)

OTHER PUBLICATIONS

Tencent Technology, Extended European Search Report and Supplementary Search Report, EP Patent Application No. 21893727.4, Feb. 23, 2024, 48 pgs.
(Continued)

*Primary Examiner* — George C Jin

(74) *Attorney, Agent, or Firm* — Morgan, Lewis & Bockius LLP

(57) ABSTRACT

The application disclose an autonomous-driving-based control method performed by a computer device. The method includes: acquiring scene information of a target vehicle; determining a current lane changing scene type of the target vehicle according to the scene information; recognizing, when the current lane changing scene type is a mandatory lane changing scene type, a first lane for completing a navigation travel route, and, when the first lane satisfies a lane changing safety check condition, controlling the target vehicle to perform lane changing operation according to the first lane. The second lane for optimizing the travel time is recognized according to the scene information when the current lane changing scene type is the free lane changing scene type. When the second lane satisfies the lane changing
(Continued)

safety check condition, the target vehicle is controlled to perform lane changing operation according to the second lane.

19 Claims, 10 Drawing Sheets

(51) Int. Cl.
| | |
|---|---|
| *B60W 30/095* | (2012.01) |
| *B60W 30/12* | (2020.01) |
| *B60W 30/14* | (2006.01) |
| *B60W 30/16* | (2020.01) |
| *B60W 40/04* | (2006.01) |
| *B60W 40/105* | (2012.01) |
| *B60W 60/00* | (2020.01) |

(52) U.S. Cl.
CPC .......... *B60W 30/12* (2013.01); *B60W 30/143* (2013.01); *B60W 30/16* (2013.01); *B60W 40/04* (2013.01); *B60W 40/105* (2013.01); *B60W 60/0011* (2020.02); *B60W 60/0015* (2020.02); *B60W 2554/4041* (2020.02); *B60W 2554/4049* (2020.02); *B60W 2554/80* (2020.02)

(58) Field of Classification Search
CPC ............. B60W 30/16; B60W 60/0015; B60W 60/0011; B60W 40/04; B60W 40/105; B60W 2554/4041; B60W 2554/80; B60W 2554/4049
See application file for complete search history.

(56) References Cited

U.S. PATENT DOCUMENTS

| | | | |
|---|---|---|---|
| 2018/0170038 A1 | 6/2018 | Shin | |
| 2019/0315345 A1* | 10/2019 | Newman | B60W 50/14 |
| 2019/0377352 A1* | 12/2019 | Weißwange | B60W 60/0027 |
| 2020/0079375 A1* | 3/2020 | Takahashi | B60W 30/09 |
| 2020/0114921 A1 | 4/2020 | Simmons et al. | |
| 2020/0189574 A1* | 6/2020 | Vignard | G08G 1/166 |
| 2020/0317199 A1* | 10/2020 | Berghöfer | B60W 30/09 |
| 2021/0122369 A1* | 4/2021 | Chen | B60W 30/12 |
| 2022/0185290 A1* | 6/2022 | Sanfridson | G08G 1/167 |
| 2022/0363258 A1* | 11/2022 | Voigt | B60W 30/12 |

FOREIGN PATENT DOCUMENTS

| | | |
|---|---|---|
| CN | 108227695 A | 6/2018 |
| CN | 108305477 A | 7/2018 |
| CN | 108983771 A | 12/2018 |
| CN | 109948801 A | 6/2019 |
| CN | 111413973 A | 7/2020 |
| CN | 112416004 A | 2/2021 |

OTHER PUBLICATIONS

Tencent Technology, ISR, PCT/CN2021/127867, Jan. 17, 2022, 3 pgs.
Tencent Technology, WO, PCT/CN2021/127867, Jan. 17, 2022, 5 pgs.
Tencent Technology, IPRP, PCT/CN2021/127867, May 16, 2023, 6 pgs.

* cited by examiner

AUTONOMOUS-DRIVING-BASED CONTROL METHOD AND APPARATUS, VEHICLE, AND RELATED DEVICE

CROSS-REFERENCE TO RELATED APPLICATIONS

This application is a continuation application of PCT Patent Application No. PCT/CN2021/127867, entitled "CONTROL METHOD AND APPARATUS BASED ON AUTONOMOUS DRIVING, AND VEHICLE AND RELATED DEVICE" filed on Nov. 1, 2021, which claims priority to Chinese Patent Application No. 202011300553.0, filed with the State Intellectual Property Office of the People's Republic of China on Nov. 19, 2020, and entitled "AUTONOMOUS-DRIVING-BASED CONTROL METHOD AND APPARATUS, VEHICLE, AND RELATED DEVICE", all of which are incorporated herein by reference in their entirety.

FIELD OF THE TECHNOLOGY

This application relates to the field of artificial intelligence (AI), and particularly to an autonomous-driving-based control method and apparatus, a vehicle, and a related device.

BACKGROUND OF THE DISCLOSURE

With the constant development of autonomous driving technology, how autonomous vehicles change lanes autonomously has received more attention. Autonomous lane changing requires autonomous vehicles to select lanes autonomously to run on the road and perform lane changing operations. Appropriate lane changing decisions may complete driving tasks better, and may also avoid traffic congestions and traffic accidents, improve traffic efficiency, and ensure road safety. Therefore, autonomous lane changing has become a major problem in a related autonomous driving technology.

SUMMARY

Embodiments of this application provide an autonomous-driving-based control method and apparatus, a vehicle, and a related device, which may enable an autonomous vehicle to autonomously change lanes more flexibly and improve lane changing safety and traffic efficiency.

An aspect of the embodiments of this application provides an autonomous-driving-based control method, including:
acquiring scene information of a target vehicle;
determining a current lane changing scene type of the target vehicle according to the scene information;
recognizing, according to the scene information when the current lane changing scene type is a mandatory lane changing scene type, a first lane for completing a navigation travel route, and controlling, in response to detecting that the first lane satisfies a lane changing safety check condition, the target vehicle according to the first lane to perform lane changing operation; and
recognizing, according to the scene information when the current lane changing scene type is a free lane changing scene type, a second lane for optimizing travel time, and controlling, in response to detecting that the second lane satisfies the lane changing safety check condition, the target vehicle according to the second lane to perform lane changing operation.

An aspect of the embodiments of this application provides an autonomous-driving-based control apparatus, including:
an information acquisition module, configured to acquire scene information of a target vehicle;
a scene determination module, configured to determine a current lane changing scene type of the target vehicle according to the scene information;
a mandatory lane changing module, configured to recognize, according to the scene information when the current lane changing scene type is a mandatory lane changing scene type, a first lane for completing a navigation travel route, and control, in response to detecting that the first lane satisfies a lane changing safety check condition, the target vehicle according to the first lane to perform lane changing operation; and
a free lane changing module, configured to recognize, according to the scene information when the current lane changing scene type is a free lane changing scene type, a second lane for optimizing travel time, and control, in response to detecting that the second lane satisfies the lane changing safety check condition, the target vehicle according to the second lane to perform lane changing operation.

An aspect of the embodiments of this application provides a computer device, including: a processor, a memory, and a network interface,
the processor being connected to the memory and the network interface, the network interface being configured to provide a data communication function, the memory being configured to store a computer program, the processor being configured to invoke the computer program to perform the method in the embodiments of this application.

An aspect of the embodiments of this application provides a computer-readable storage medium, storing a computer program, the computer program including program instructions, the program instructions, when executed by a processor, implementing the method in the embodiments of this application.

An aspect of the embodiments of this application provides a computer program product or a computer program, including computer instructions, the computer instructions being stored in a computer-readable storage medium, a processor of a computer device reading the computer instructions from the computer-readable storage medium, and executing the computer instructions, to cause the computer device to perform the method in the embodiments of this application.

An aspect of the embodiments of this application provides a vehicle, including the above-mentioned autonomous-driving-based control apparatus, or, including the above-mentioned computer device, or, including the above-mentioned computer-readable storage medium.

BRIEF DESCRIPTION OF THE DRAWINGS

To describe the technical solutions of the embodiments of this application or the related art more clearly, the following briefly introduces the accompanying drawings required for describing the embodiments or the related art. The accompanying drawings in the following description show merely some embodiments of this application, and a person of ordinary skill in the art may still derive other drawings from these accompanying drawings without creative efforts.

DESCRIPTION OF EMBODIMENTS

Figure 1:
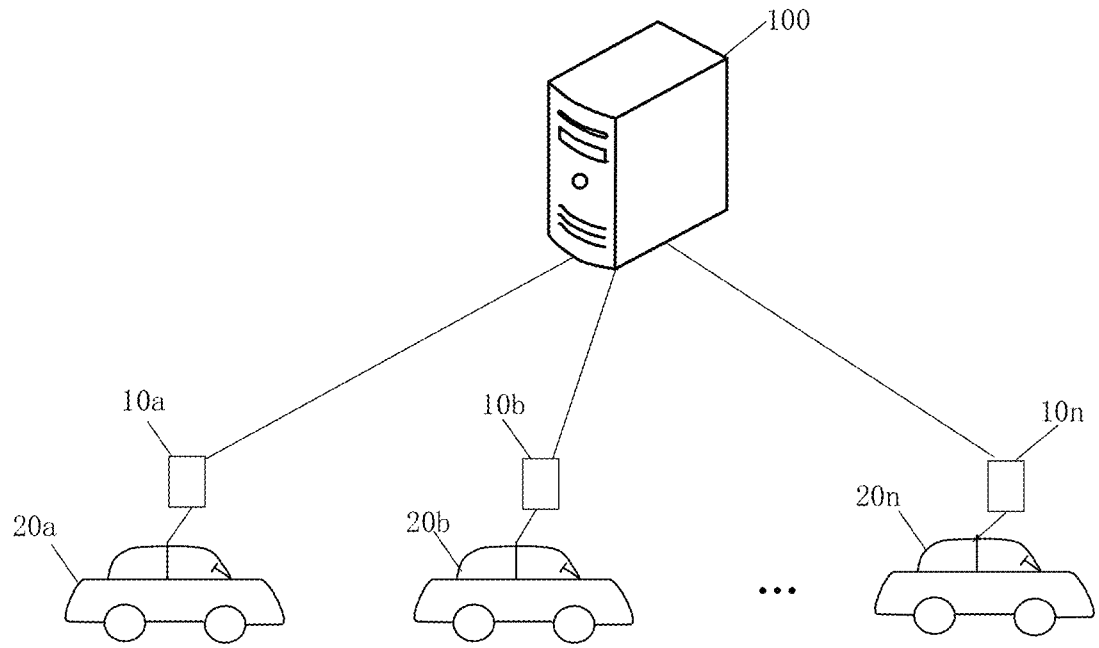
FIG. 1 is a diagram of a network architecture according to an embodiment of this application.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application involve technologies such as automatic driving, and ML of AI, and are specifically described by using the following embodiments.

In a common autonomous lane changing solution, lane-level global path planning is implemented. That is, where lane changing is needed has been substantially determined at the beginning of an autonomous driving task. However, fast-changing complex traffic flows may not be coped with well by the lane-level global path planning solution. For example, when a globally planned position where lane changing is needed is blocked by a static obstacle, an autonomous vehicle may not change lane normally. Alternatively, when a vehicle in front of an autonomous vehicle in a current lane runs slowly, the autonomous vehicle may run slowly. It can be seen that a current lane changing manner for an autonomous vehicle is not so flexible and low in traffic efficiency, and may bring potential safety hazards.

The embodiments of this application provide an autonomous-driving-based control method. An autonomous vehicle may autonomously change lanes more flexibly, and lane changing safety and traffic efficiency may be improved.

FIG. 1 is a diagram of a network architecture according to an embodiment of this application. As shown in FIG. 1, the network architecture may include a service server 100 and a terminal device cluster. The terminal device cluster may include multiple terminal devices. As shown in FIG. 1, a terminal device 10A, a terminal device 10B, . . . , and a terminal device 10n may be specifically included. As shown in FIG. 1, each of the terminal device 10A, the terminal device 10B, . . . , and the terminal device 10n may establish a network connection with the service server so as to perform data interaction with the service server 100 through the network connection. Therefore, the service server 100 may receive service data from each terminal device.

In this application, each terminal device may be a vehicle-mounted terminal or a mobile terminal. The terminal device is deployed in a running vehicle. Each vehicle may be provided with a terminal device so as to obtain a control command for autonomous driving through data interaction between the terminal device and the service server, and the terminal device controls the vehicle for autonomous driving through the control command. As shown in FIG. 1, the service server 100 may receive service data from each terminal device, call source data about autonomous driving, and then perform a logical operation to obtain a control command for controlling a vehicle to run. The service data may be scene information. The scene information includes vehicle related information, road information, environmental information, positioning information, end information, map information, etc. The source data may be parameter data needed by a machine learning model for autonomous driving and the logical operation. In this application, when each vehicle runs, each terminal device corresponding to the vehicle may continuously initiate a service request for lane changing detection to the service server 100. The service server, when receiving the service request of the terminal device, may perform the logical operation on the service data transmitted by the terminal device, and then transmit a control command to the terminal device. Each terminal device, when receiving the control command transmitted by the service server 100, may control the corresponding vehicle according to the control command to perform lane changing operation.

Data interaction of the terminal device 10A, an autonomous vehicle 20a, and the service server 100 is taken as an example. The autonomous vehicle 20a runs on the road. The autonomous vehicle 20a is provided with the terminal device 10A. The terminal device 10A may send acquired information about the autonomous vehicle 20a to the service server 100 as scene information. The service server 100, after receiving the scene information transmitted by the terminal device 10A, may call source data about autonomous driving to perform a logical operation together with the scene information. The logical operation includes determining a current lane changing scene type of the autonomous vehicle 20a first, then recognizing target lanes according to different current lane changing scene types, and when a safety check condition is satisfied, transmitting a control command to cause the autonomous vehicle 20a to change lane to the target lane. The target lane refers to a lane obtained by the service server 100 by the operation and suitable for lane changing of the autonomous vehicle 20a in a current scene.

It can be understood that the method provided in the embodiments of this application may be performed by a computer device, which may be the above-mentioned service server 1000. The service server 1000 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

It can be understood that the above-mentioned data interaction process is merely an example of the embodiments of this application. The logical operation may also be performed in the terminal device, not limited to the service server 100. In such case, the terminal device initiates a service request for lane changing safety check, and may acquire source data about autonomous driving from the service server 100 after acquiring service data, and then perform the logical operation to obtain a control command for controlling the vehicle to run. Similarly, the source data about autonomous driving may also be stored in the terminal device, not limited to the service server 100. No limits are made in this application.

The terminal device and the service server may be directly or indirectly connected through wired or wireless communication, which is not limited in this application.

Figure 2:
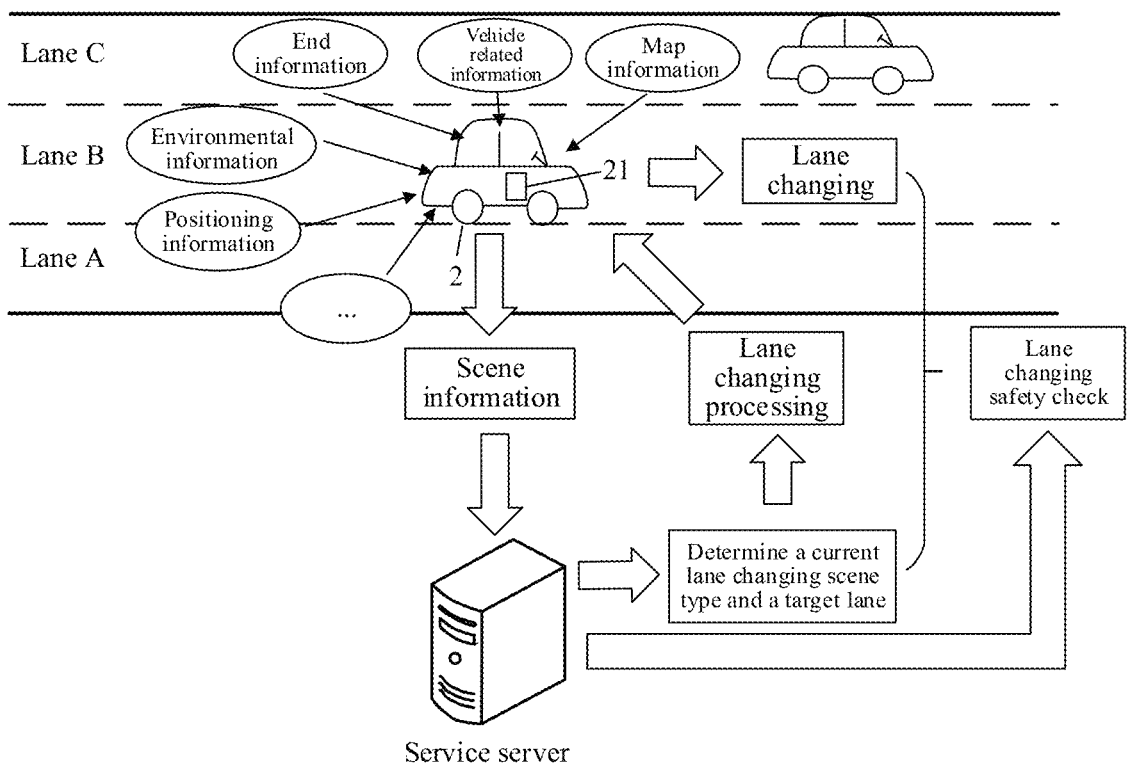
FIG. 2 is a schematic diagram of an autonomous lane changing scenario according to an embodiment of this application.

For ease of understanding, referring to FIG. 2, FIG. 2 is a schematic diagram of an autonomous lane changing scenario according to an embodiment of this application. A service server shown in FIG. 2 may be the above-mentioned service server 100. An autonomous vehicle 2 shown in FIG. 2 may be the autonomous vehicle 20b shown in FIG. 1. A vehicle-mounted terminal 21 is installed on the autonomous vehicle 2. The vehicle-mounted terminal 21 may be the terminal device 10B shown in FIG. 1. As shown in FIG. 2, the autonomous vehicle 2 runs in lane B. In such case, the vehicle-mounted terminal 21 may transmit current scene information for the autonomous vehicle 2 to the service server. The scene information may include positioning information, map information, environmental information, end information, vehicle related information, etc. The vehicle related information refers to information about the autonomous vehicle 2 and a neighbor vehicle thereof. That is, the vehicle related information may include a speed and acceleration of the autonomous vehicle 2 and a speed and acceleration of the neighbor vehicle of the autonomous vehicle 2. The vehicle related information may further include a positional relationship between the autonomous vehicle 2 and the neighbor vehicle thereof. A collector for the scene information may be installed on the autonomous vehicle 2, on the vehicle-mounted terminal 21, or on the autonomous vehicle 2 and the vehicle-mounted terminal 21 respectively. No limits are made herein. However, for clarity of description, the collector is installed on the vehicle-mounted terminal 21 by default hereinafter.

As shown in FIG. 2, the service server, after acquiring the scene information of the autonomous vehicle 2, may determine a current lane changing scene type according to the scene information, and then determine a best lane currently theoretically suitable for the autonomous vehicle 2 as a target lane according to the current lane changing scene type and the scene information. The current lane changing scene type may include two major scene types: a free lane changing scene type (determining to overtake due to a low speed of a front vehicle) and a mandatory lane changing scene type (lane selection at a crossing, road blockage by a static obstacle, etc.). The free lane changing scene type refers to that the autonomous vehicle 2 selects to change the lane autonomously to increase the traffic speed to further optimize travel time, and if the lane is not changed, there is no influence on a task goal. The mandatory lane changing scene type refers to that it is impossible to achieve the task goal if the vehicle does not change lane to the target lane in a current scene. The task goal refers to a target end to be reached that is set before the autonomous vehicle 2 starts. Then, the service server may perform lane changing operation on the autonomous vehicle 2 according to the target lane and the scene information. The target lane refers to a best lane where a current navigation travel route may be completed. The lane changing operation refers to that the service server monitors whether the autonomous vehicle 2 satisfies a lane changing condition first according to the scene information, and if the autonomous vehicle does not satisfy the lane changing condition, adjusts a position and speed of the autonomous vehicle 2 to create a safe lane changing environment. During the lane changing operation, the service server may transmit a control command to the vehicle-mounted terminal 21. The vehicle-mounted terminal 21, after receiving the control command, may control the autonomous vehicle 2 according to the control command to perform a lane changing operation. For example, the service server determines lane C as the target lane according to the scene information. However, the autonomous vehicle 2 is too close to a front vehicle 1 in lane C, and it is risky to change the lane, so a lane changing safety check condition is not satisfied. In such case, the service server may transmit a control command of reducing the travel speed to control the autonomous vehicle 2 to get farther from the front vehicle 1 in lane C. When a distance between the two satisfies the lane changing safety check condition, the service server may transmit a control command to cause the autonomous vehicle 2 to change lane from lane B to lane C.

As shown in FIG. 2, the service server may further perform lane changing safety check on the whole autonomous lane changing process according to the scene information. The lane changing safety check is performed continuously. That is, after receiving a request for lane changing detection from the vehicle-mounted terminal 21, the service server may continuously perform lane changing safety check according to the received scene information until the autonomous vehicle 2 completes lane changing. During the lane changing safety check, when it is detected that the lane changing safety check condition is not satisfied currently, the service server may stop the processing of controlling the autonomous vehicle 2 to change lane to the target lane, and control the autonomous vehicle 2 to run back to a current driving lane, i.e., a lane 2.

Specific implementation processes of the lane changing safety check, determination of the current lane changing scene type and the target lane, and lane changing operation and lane changing execution under different lane changing scene types may refer to descriptions in the following embodiments corresponding to FIGS. 3 to 12B.

Figure 3:
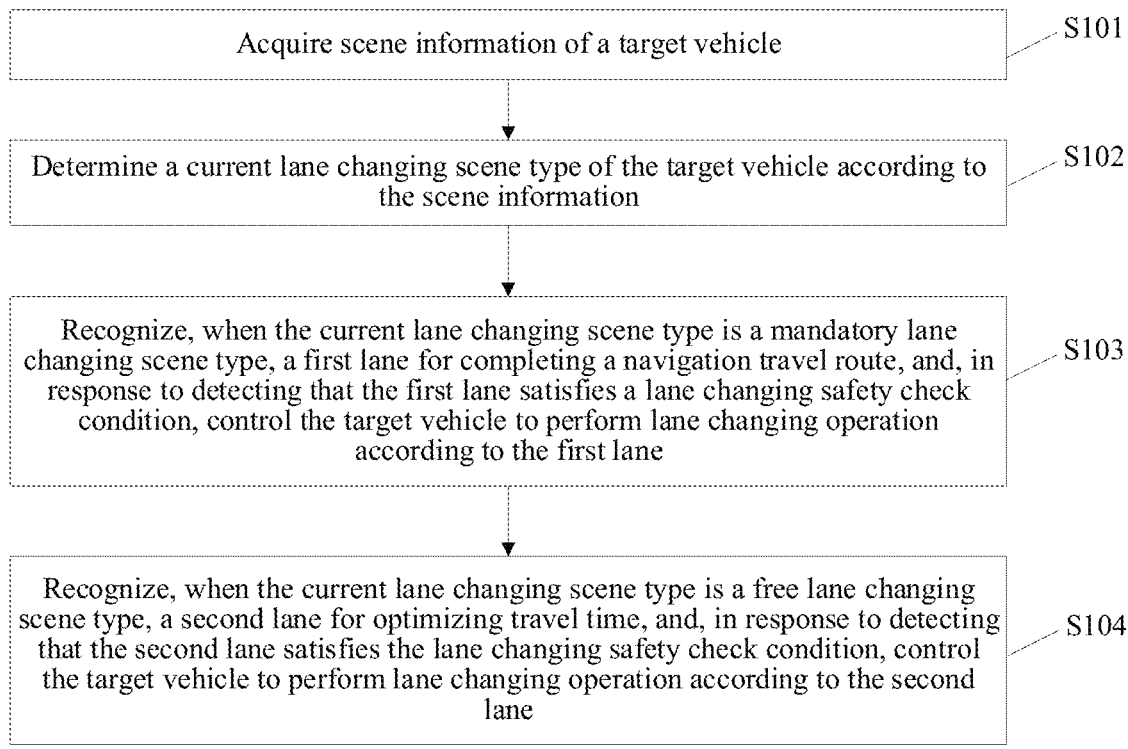
FIG. 3 is a schematic flowchart of an autonomous-driving-based control method according to an embodiment of this application.

Referring to FIG. 3, FIG. 3 is a schematic flowchart of an autonomous-driving-based control method according to an embodiment of this application. The method may be performed by a service server (such as the service server 100 in the embodiment corresponding to FIG. 1), or a terminal device (such as the terminal device 10A in the embodiment corresponding to FIG. 1). In this embodiment, descriptions are made taking the method being performed by a computer device (the computer device may be the service server 100, or the terminal device 10A) as an example. As shown in FIG. 3, the process may include the following steps:

S101: Acquire scene information of a target vehicle.

Specifically, the scene information may reflect a comprehensive condition of a vehicle driving behavior and driving environment in certain time and space ranges. For example, the scene information includes vehicle related information, road information, environmental information, positioning information, end information, and map information. The vehicle related information includes speeds, accelerations, vehicle types, current states, etc., of the target vehicle and a vehicle around the target vehicle. The road information includes a congestion condition of a current lane, a speed limit condition of the lane, an average speed in the lane, a distance to the end of the lane, etc. The environmental information includes obstacle detection information. The scene information may be collected by a sensor, a laser radar, a camera, a millimeter wave radar, a navigation system, a positioning system, a high-precision map, etc. The computer device (such as the terminal device 10A in the embodiment corresponding to FIG. 1) may collect the scene information.

S102: Determine a current lane changing scene type of the target vehicle according to the scene information.

Specifically, a current lane changing scene type may be determined according to a current scene where the target vehicle is. For example, a free overtaking scene, a junction scene, a main/side road/entrance/exit ramp scene, a static obstacle scene, and a stop-at-end scene correspond to a free overtaking lane changing scene type, a junction lane changing scene type, an exit lane changing scene type, a static obstacle lane changing scene type, and a stop-at-end lane changing scene type respectively. These lane changing scene types may be divided into two major lane changing scene types: a mandatory lane changing scene type and a free lane changing scene type. The mandatory lane changing scene type refers to that, in this scene, the target vehicle needs to perform lane changing if a determined best lane is not a current driving lane of the target vehicle, otherwise may not reach a task end according to a current navigation travel route. The free lane changing scene type refers to that, in this scene, if the determined best lane is not the current driving lane of the target vehicle, the target vehicle may still select to reach the task end according to the current navigation travel route without lane changing, except that more time may be needed. Therefore, the free overtaking lane changing scene type is a free lane changing scene type. The junction lane changing scene type, the exit lane changing scene type, the static obstacle lane changing scene type, and the stop-at-end lane changing scene type are all mandatory lane changing scene types.

S103: Recognize, when the current lane changing scene type is a mandatory lane changing scene type, a first lane for completing a navigation travel route, and, in response to detecting that the first lane satisfies a lane changing safety check condition, control the target vehicle to perform lane changing operation according to the first lane.

Specifically, if determining that the current lane changing scene type of the target vehicle is a mandatory lane changing scene type, the computer device may recognize a best lane as a first lane according to the scene information, such as the current lane changing scene type, a navigation travel route, a vehicle speed, and a stopping position. The best lane refers to a lane most suitable for driving in the mandatory lane changing scene type in candidate lanes capable of completing the navigation travel route.

Specifically, after recognizing the first lane, the computer device does not control the target vehicle to perform a lane changing operation immediately. This is because there are so many vehicles running on the road and traffic accidents are likely to happen. When a distance between a first vehicle in front end of the target vehicle in the first lane and a first vehicle behind the target vehicle in the first lane is relatively long, there is a chance for the target vehicle to cut in to the first lane. Therefore, the computer device may acquire a neighbor vehicle spacing region of the first lane, and control the target vehicle to move to a lane changing preparation position according to the neighbor vehicle spacing region. The neighbor vehicle spacing region is a spacing region between a first vehicle and a second vehicle in the first lane. The first vehicle is a vehicle closest to a front end of the target vehicle in the first lane. The second vehicle is a vehicle closest to a rear end of the target vehicle in the first lane. The lane changing preparation position refers to a position where a lane changing environment is relatively safe. Before the target vehicle moves to the lane changing preparation position to start lane changing, the computer device needs to confirm lane changing safety of the target vehicle. The computer device may perform lane changing safety check on the first lane, and when determining that the target vehicle satisfies a lane changing safety check condition, control the target vehicle to change lane to the first lane.

The lane changing safety check may include a safety guarantee rule. The safety guarantee rule is used for ensuring that the target vehicle is capable of avoiding the first vehicle by emergency braking in emergency during lane changing and that there is enough time for the second vehicle to respond in a case of emergency braking of the target vehicle during lane changing. That is, after the target vehicle moves into the first lane, a distance between the target vehicle and the first vehicle is required to be not shorter than a safety distance, and a distance between the target vehicle and the second vehicle is also required to be not shorter than the safety distance. The safety distance may be a threshold specified in advance, or a value calculated according to current speeds, positions, and other states of the target vehicle, the first vehicle, and the second vehicle. For example, it is obtained that the safety distance between the target vehicle and the first vehicle is 2 m, and the computer device determines according to the scene information that a current actual distance between the target vehicle and the first vehicle is 1 m. In such case, the computer device determines that it is not safe to change the lane at this point, and stops controlling the target vehicle to change the lane. If the target vehicle has been executing a control command for lane changing, the computer device may transmit a new control command to stop the lane changing of the target vehicle, and control the target vehicle to run back to the current driving lane.

A first safety distance threshold between the target vehicle and the first vehicle may be calculated according to formula (1):

$$d_1 = \frac{V_{ego}^2}{a_{ego}} + v_{ego} t_{delay} - \frac{v_1}{a_1}$$

where $d_1$ represents the first safety distance threshold, $v_{ego}$, $a_{ego}$, and $t_{delay}$ represent the current speed, current acceleration, and response time of the target vehicle respectively, and $v_1$ and $a_1$ represent a first speed and first acceleration of the first vehicle respectively. $t_{delay}$ may be adjusted according to a vehicle type of the target vehicle, and other actual situations, and the other data may be acquired from the scene information. The first safety distance threshold is a minimum safety distance between the target vehicle and the first vehicle. If the actual distance between the target vehicle and the first vehicle is less than the first safety distance threshold, it is determined that the first lane does not satisfy the lane changing safety check condition.

A second safety distance threshold between the target vehicle and the second vehicle may be calculated according to formula (2):

$$d_r = \frac{V_r^2}{2a_r} + v_r t_{delay} - \frac{v_{ego}^2}{2a_{ego}}$$

where $d_r$ represents the second safety distance threshold, $v_{ego}$, $a_{ego}$, and $t_{delay}$ represent the current speed, current acceleration, and response time of the target vehicle respectively, and $v_r$ and $a_r$ represent a second speed and second acceleration of the second vehicle respectively. $t_{delay}$ may be adjusted according to the vehicle type of the target vehicle, and other actual situations, and the other data may be acquired from the scene information. The second safety distance threshold is a minimum safety distance between the target vehicle and the second vehicle. If the actual distance between the target vehicle and the second vehicle is less than the second safety distance threshold, it is determined that the first lane does not satisfy the lane changing safety check condition.

Therefore, when lane changing safety check is performed on the target vehicle by use of the safety guarantee rule, if a front vehicle distance is not less than the first safety distance threshold and a rear vehicle distance is not less than the second safety distance threshold, it is determined that the first lane satisfies the lane safety check condition, and lane changing safety check succeeds. If the front vehicle distance is less than the first safety distance threshold or the rear vehicle distance is less than the second safety distance threshold, it is determined that the first lane does not satisfy the lane safety check condition, and the target vehicle is controlled to stop lane changing to the first lane.

The lane changing safety check may further include using a data-driven time-to-collision (TTC) (also referred to as collision time distance) model. The safety guarantee rule is used for ensuring the most basic lane changing safety. In a case of determining that it is safe to change the lane, social acceptance may further be considered. The data-driven TTC model may be built as follows: collecting lane changing data on the road, extracting features, and performing training with a speed of a current vehicle, a speed of a vehicle in front, a traffic congestion condition, a type of the vehicle in front, a lane level (urban road, highway, and a junction approaching condition), current weather, etc., to obtain a logistic regression model of TTC TTC=Logistic (Features) as a TTC recognition model for calling during lane changing safety check. In a driving process of the target vehicle, a lane changing feature is acquired from the scene information. The lane changing feature is the above-mentioned extracted feature. The lane changing feature is input to the TTC recognition model, and expected front vehicle TTC and expected rear vehicle TTC are output by use of the TTC recognition model. The expected front vehicle TTC is TTC between the target vehicle and the first vehicle in an ideal state. If actual TTC between the target vehicle and the first vehicle is less than the expected front vehicle TTC, it is determined that the lane changing safety check condition is not satisfied. Similarly, the expected rear vehicle TTC is TTC between the second vehicle and the target vehicle in the ideal state. If actual TTC between the target vehicle and the second vehicle is less than the expected rear vehicle TTC, it is determined that the lane changing safety check condition is not satisfied.

The actual TTC may be obtained according to formula (3):

$$T = d \div v,$$

where T represents actual TTC of vehicle A, d represents a distance between vehicle A and vehicle B, and v represents a speed of vehicle A. Vehicle A is behind vehicle B. Actual TTC of the target vehicle and actual TTC of the vehicle behind may be calculated according to formula (3). During lane changing safety check, the service server may acquire a lane changing feature from the scene information, and then inputs the lane changing feature to the TTC recognition model to calculate expected front vehicle TTC and expected rear vehicle TTC. Then, the service server may calculate actual TTC of the target vehicle and actual TTC of the vehicle behind according to formula (3). If the actual TTC of the target vehicle is not less than the expected front vehicle TTC, and the actual TTC of the second vehicle is not less than the expected rear vehicle TTC, it is determined that the first lane satisfies the lane changing safety check condition. If the actual TTC of the target vehicle is less than the expected front vehicle TTC, or the actual TTC of the second vehicle is less than the expected rear vehicle TTC, it is determined that the first lane does not satisfy the lane safety check condition, and the target vehicle is controlled to stop lane changing to the first lane.

It can be understood that the computer device, when performing lane changing safety check on the first lane, may use the safety guarantee rule only for lane changing safety check, or use the TTC model only for lane changing safety check, or use both the safety guarantee rule and the TTC model for lane changing safety check of the first lane. If the two check manners are used for lane changing safety check of the first lane, it may be determined that lane changing safety check succeeds when the two check manners succeed. That is, if the first lane does not comply with the safety guarantee rule, or the actual TTC is less than the expected TTC, it is determined that the first lane does not satisfy the lane safety check condition, and the target vehicle is controlled to stop lane changing to the first lane.

S104: Recognize, according to the scene information when the current lane changing scene type is a free lane changing scene type, a second lane for optimizing travel time, and, in response to detecting that the second lane satisfies the lane changing safety check condition, control the target vehicle to perform lane changing operation according to the second lane.

Specifically, if the current lane changing scene type is a free lane changing scene type, it indicates that the target vehicle may continue running in the current driving lane to complete the navigation travel route. However, a road environment is complex and variable, so more time may be needed to continue running in the current driving lane. For example, a vehicle in front end of the target vehicle in the current driving lane runs slowly, and the navigation travel route may still be completed in a lane beside where there are few running vehicles and an average speed is higher. In such case, if the target vehicle may change lane to the lane beside where the speed is higher, not only may the navigation travel route be completed, but also travel time may be optimized. Therefore, when the target vehicle is in the free lane changing scene type, a second lane for optimizing travel time may be recognized according to the scene information.

Specifically, whether lane changing is needed in a current driving state may be determined by a machine learning method. The computer device may extract a lane feature of a candidate lane and a driving feature from the scene information. The candidate lane refers to a lane where the navigation travel route may be completed, such as the current driving lane, a left lane, and a right lane. The lane feature refers to a feature related to the candidate lane, including an average speed in the candidate lane within a past preset time period, such as an average speed in the lane in past 30 s and an average speed in the lane in past 1 minute, a speed limit of the lane, a distance to the end of the lane, and the number of lanes between the lane and an exit lane. The driving feature refers to some action features and task features of the target vehicle during running, such as last lane changing time, last lane changing lane, current speed, duration when the speed is lower than an ideal speed, and a distance to an exit of the road. The above-mentioned features are merely examples, and other features may be selected in practical applications. Then, the computer device processes the lane feature and the driving feature by use of a lane evaluation model to obtain an estimated parameter value of the candidate lane. The lane evaluation model is obtained by training according to driving behavior samples. The driving behavior samples refer to lane feature samples and driving feature samples during active lane changing of a user. Then, a candidate lane with a maximum estimated parameter value is determined as the second lane for optimizing the travel time. If the second lane is not the current driving lane of the target vehicle, the computer device may control, in response to detecting that the second lane satisfies the lane changing safety check condition, the target vehicle according to the target lane to perform lane changing operation. Lane changing safety check on the second lane may refer to the descriptions about lane changing safety check in step S103, and will not be elaborated herein.

In this embodiment of this application, the current lane changing scene type of the target vehicle may be determined according to the acquired scene information of the target vehicle. The first lane for completing the navigation travel route may be recognized according to the scene information when the current lane changing scene type is the mandatory lane changing scene type. In response to detecting that the first lane satisfies the lane changing safety check condition, the target vehicle is controlled according to the first lane to perform lane changing operation. The second lane for optimizing the travel time is recognized according to the scene information when the current lane changing scene type is the free lane changing scene type. In response to detecting that the second lane satisfies the lane changing safety check condition, the target vehicle is controlled according to the second lane to perform lane changing operation. Through the method provided in this embodiment of this application, the current lane scene type of the target vehicle may be determined according to the acquired scene information of the target vehicle, and then different lane changing operation is performed on the target vehicle according to different current lane changing scene types. Therefore, an autonomous vehicle may change lanes flexibly to avoid traffic congestion better and increase the travel speed.

Figure 4:
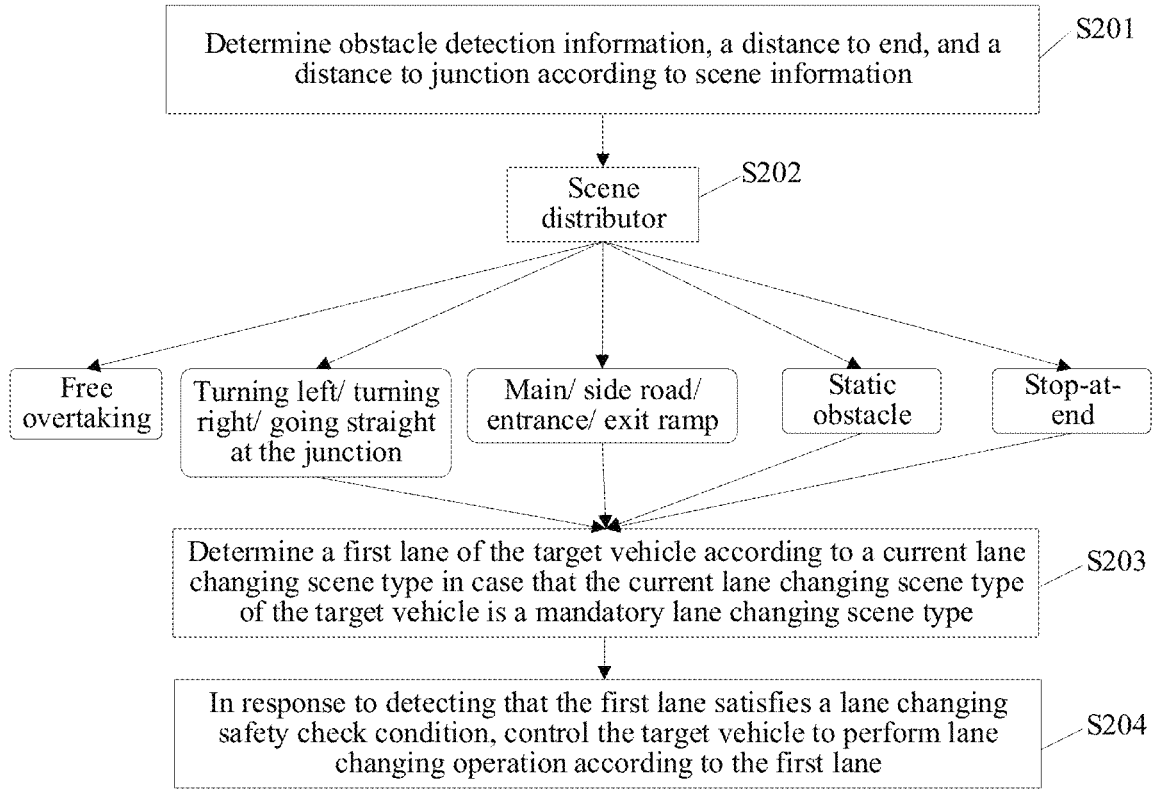
FIG. 4 is a schematic flowchart of mandatory lane changing according to an embodiment of this application.

Further, referring to FIG. 4, FIG. 4 is a schematic flowchart of mandatory lane changing according to an embodiment of this application. The method may be performed by a service server (such as the service server 100 in the embodiment corresponding to FIG. 1), or a terminal device (such as the terminal device 10A in the embodiment corresponding to FIG. 1). In this embodiment, descriptions are made taking the method being performed by a computer device (the computer device may be the service server 100, or the terminal device 10A) as an example. As shown in FIG. 4, the process may include the following steps:

S201: Determine obstacle detection information, a distance to end (D2E), and a distance to junction (D2J) according to scene information.

Specifically, the obstacle detection information refers to whether there is a static obstacle in front of a target vehicle in a current driving lane, and may be detected by a radar, a sensor, or the like. A detection distance may be set according to an actual situation. For example, it is specified that the detection distance is 200 meters. In such case, the computer device determines, in response to detecting no static obstacle within 200 meters in front end of the target vehicle in the current driving lane, that there is no static obstacle in front end of the target vehicle. The D2E refers to a distance of the target vehicle to a task end, and may be calculated according to a high-precision map and positioning information. The D2J refers to a current distance of the target vehicle to a next junction or exit, and may also be calculated according to the high-precision map and the positioning information.

S202: Input the obstacle detection information, the D2E, and the D2J to a scene distributor to determine a current scene of a target vehicle.

Specifically, a current lane changing scene type of the target vehicle may be determined according to the current scene. The current scene includes a free overtaking scene, a junction scene, a main/side road/entrance/exit ramp scene, a static obstacle scene, and a stop-at-end scene. As a most common scene, the free overtaking scene mostly occurs in a structural road, such as a highway or an urban expressway. In this scene, distances of the target vehicle to a next junction and to the end are both long enough, and it may be determined that all lanes may lead to a final destination. In such case, the target vehicle may select to run in an uncrowded lane, and if the target vehicle does not change the lane, there is no influence on reaching the final destination. The junction scene is mainly suitable for an L4 urban autonomous driving system. In this scene, the target vehicle selects a corresponding lane when turning left/going straight/turning right at a junction, otherwise may not complete a target task. Like the junction scene, in the main/side road/entrance/exit ramp scene, a candidate lane may be acquired from a map. The static obstacle scene refers to that, if there is a static obstacle (such as a cone and a construction facility) in front end of the target vehicle, the target vehicle needs to change lane to a left or right lane to avoid the obstacle. The stop-at-end scene refers to that, when a D2E of the target vehicle is less than a certain numerical value, the stop-at-end scene is entered. The stop-at-end scene is mainly suitable for an L4 autonomous driving system. That is, the vehicle needs to pull over at the end, so the rightmost lane is selected as a target lane in this scene.

Figure 5:
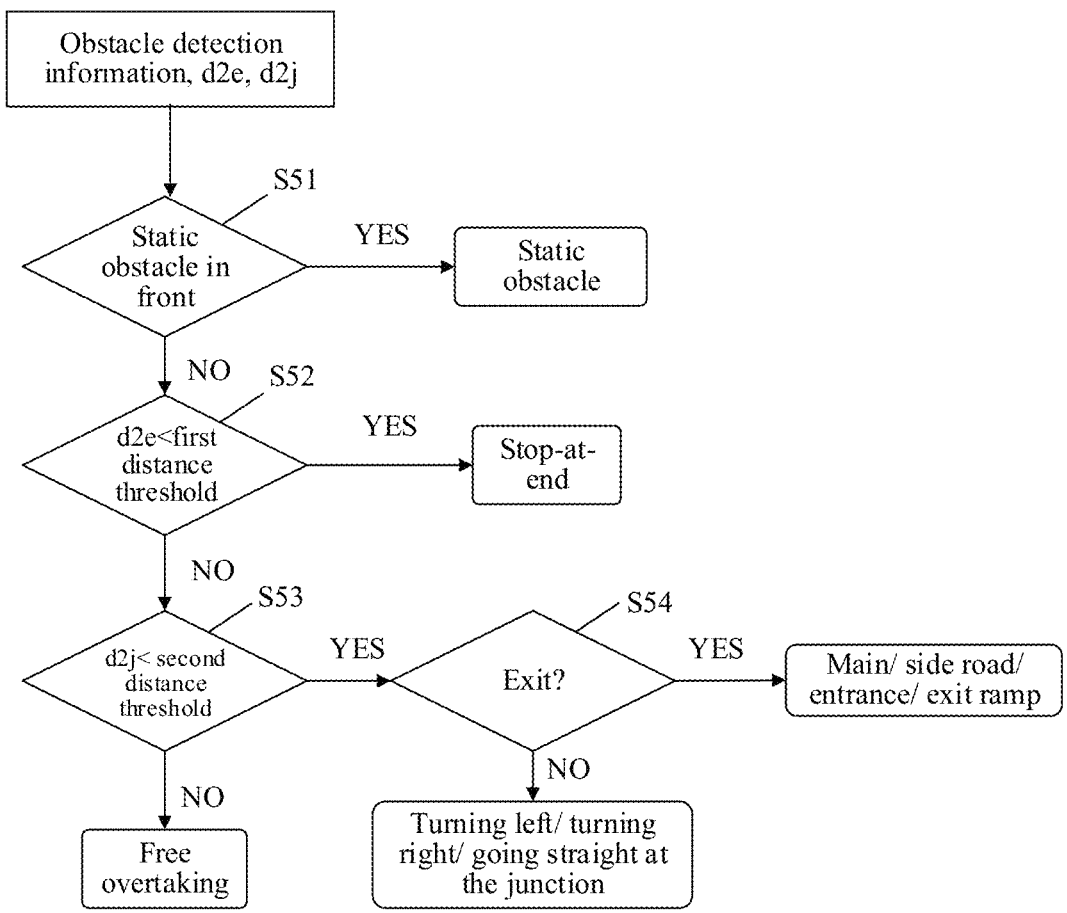
FIG. 5 is a schematic design diagram of a scene distribution decision tree according to an embodiment of this application.

Specifically, the scene distributor may be implemented by a decision tree design. For ease of understanding, referring to FIG. 5 together, FIG. 5 is a schematic design diagram of a scene distribution decision tree according to an embodiment of this application. As shown in FIG. 5, the whole decision process may include the following steps:

S51: Determine whether there is a static obstacle in front end of the target vehicle.

Specifically, whether there is a static obstacle in front end of the target vehicle may be determined first according to the obstacle detection information. The front end of the target vehicle may be within a range of a detection threshold in front end of the target vehicle in the current driving lane. A value of the detection threshold may be set according to an actual situation. It may be a distance to a next junction, or a directly set numerical value. If the obstacle detection information indicates that there is an obstacle in front end of the target vehicle, it is determined that the current lane changing scene type of the target vehicle is a static obstacle lane changing scene type. If the obstacle detection information indicates that there is an obstacle in front end of the target vehicle, step S52 is performed to continue determining the current lane changing scene type.

S52: Determine whether the D2E is less than a first distance threshold.

Specifically, after whether there is an obstacle in front end of the target vehicle is determined, whether the target vehicle is about to reach the end at this point is determined first. Therefore, the D2E may be compared with a set first distance threshold. If the D2E is less than the first distance threshold, it is determined that the current lane changing scene type of the target vehicle is a stop-at-end lane changing scene type. If the D2E is not less than the first distance threshold, step S53 is performed to continue determining the current lane changing scene type.

S53: Determine whether the D2J is less than a second distance threshold.

Specifically, when determining that the target vehicle is relatively far from the end and is not stopped at the end, the computer device may compare the D2J with a set second distance threshold. If the D2J is not less than the second distance threshold, it is determined that the current lane changing scene type of the target vehicle is a free overtaking lane changing scene type. If the D2J is less than the second distance threshold, step S54 is performed to continue determining the current lane changing scene type.

S54: Acquire junction map information of a junction, and determine a junction condition.

Specifically, the junction may be a crossing, a main/side road, and an entrance/exit ramp. There are three conditions at the crossing: turning left at the crossing, turning right at the crossing, and going straight at the crossing. The main/side road and the entrance/exit ramp may be determined as exits. If there is no traffic light in the current scene, the lane changing scene type may be correspondingly defined as an exit lane changing scene type. Therefore, if the junction map information indicates that the junction is an exit, it is determined that the current lane changing scene type of the target vehicle is an exit lane changing scene type, otherwise it is determined that the current lane changing scene type of the target vehicle is a junction lane changing scene type.

S203: Determine a first lane of the target vehicle according to a current lane changing scene type when the current lane changing scene type of the target vehicle is a mandatory lane changing scene type.

Figure 6A:
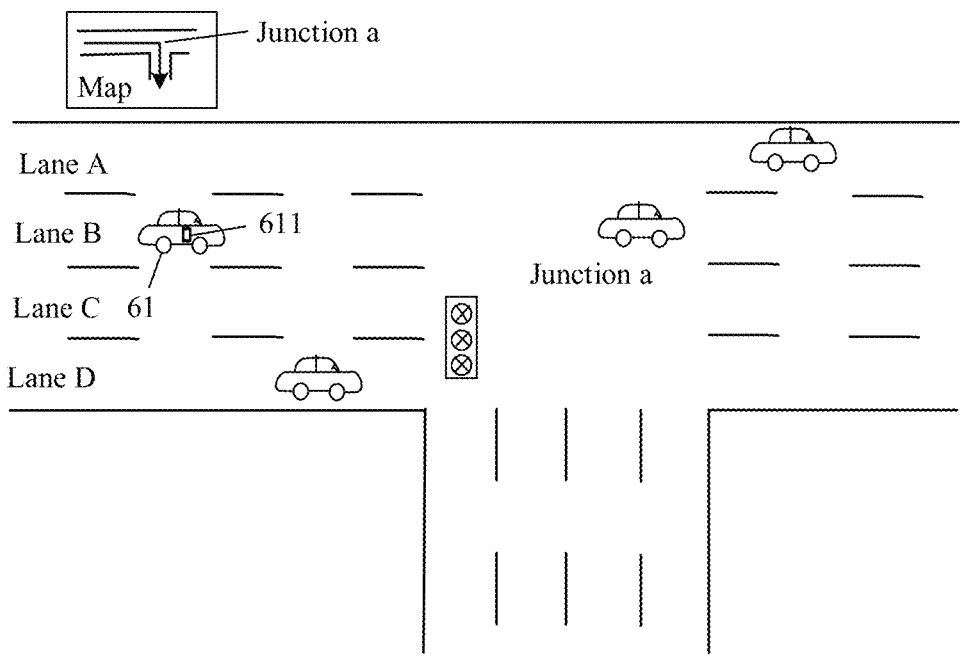
FIGS. 6A to 6C are each a schematic scenario diagram of recognizing a first lane according to an embodiment of this application.
Figure 6B:
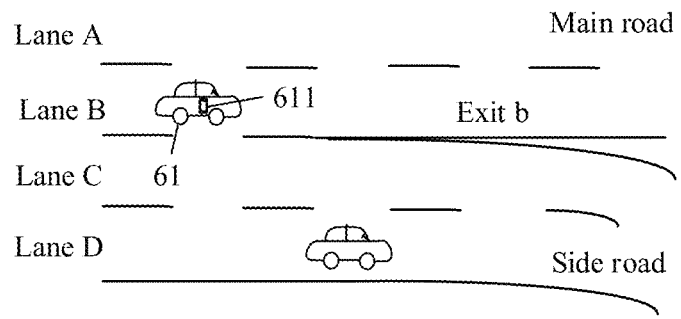
Figure 6C:
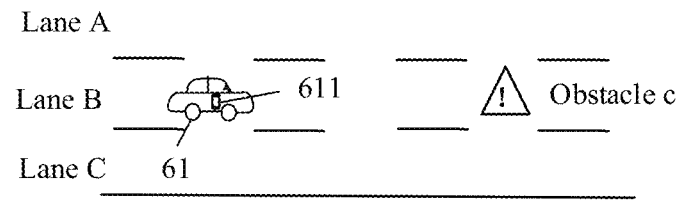

Specifically, the junction lane changing scene type, the exit lane changing scene type, the static obstacle lane changing scene type, and the stop-at-end lane changing scene type are all mandatory lane changing scene types. If determining that the current lane changing scene type of the target vehicle is a mandatory lane changing scene type, the computer device may recognize a best lane for completing a navigation travel route as a first lane according to the scene information, such as the current lane changing scene type, the navigation travel route, a vehicle speed, and a stopping position. For ease of understanding, referring to FIGS. 6A to 6C together, FIGS. 6A to 6C are each a schematic scenario diagram of recognizing a first lane according to an embodiment of this application.

If the current lane changing scene type is the junction lane changing scene type, the computer device may determine first, according to the navigation travel route, whether the target vehicle is to turn left, turn right, or go straight at a next junction. As shown in FIG. 6A, a target vehicle 61 is running in lane B. According to a navigation travel route in a map, it may be determined that the target vehicle 61 is to turn right at junction a. It can be seen from high-precision map information that only a vehicle in lane C or lane D may turn right at junction a. The target vehicle 61 may not turn right normally if continuing running in lane B without lane changing, and forcing the target vehicle 61 to turn right may cause a traffic accident. Therefore, lane C and lane D are determined as candidate lanes. Then, a first lane may be selected according to vehicle speeds in the candidate lanes and degrees of difficulty in lane changing to the candidate lanes. When red light at the junction is on, a distance of a stopping position to the junction may also be considered.

If the current lane changing scene type is the exit lane changing scene type, a current road may be a main/side road or an entrance/exit ramp. Like the junction scene, in this scene, a candidate lane may be acquired from a map, and other lanes are considered as wrong lanes. As shown in FIG. 6B, a target vehicle 61 is running in lane B. According to a navigation travel route in a map, it may be determined that the target vehicle 61 is to move into a side road at junction b. It can be seen from high-precision map information that only a vehicle in lane C or lane D may move into the side road at junction b. If the target vehicle 61 continues running in lane B without lane changing, forcing the target vehicle 61 to turn right may cause a traffic accident. Therefore, lane C and lane D are determined as candidate lanes. The difference between the exit lane changing scene type and the junction lane changing scene type is that, in this scene, there is no traffic light, and vehicle speeds are relatively high in most cases. Therefore, a first lane may be selected mainly according to vehicle speeds in the candidate lanes and degrees of difficulty in lane changing to the candidate lanes.

If the current lane changing scene type is the static obstacle lane changing scene type, namely there is a static obstacle (a cone, a construction facility, etc.) in front end of the target vehicle, the target vehicle needs to change lane to a left or right lane to avoid the obstacle. As shown in FIG. 6C, a target vehicle 61 runs in lane B, and there is a static obstacle c in front in lane B. The target vehicle 61 cannot continue running in lane B, otherwise there may be caused a traffic accident. Therefore, a lane changing operation is needed. In such case, the computer device may first acquire a lane where normal traffic is ensured, and then filter out wrong lane B. That is, lane A or lane C is determined as a candidate lane. Then, the computer device may select the best lane from the candidate lanes as the first lane. In such case, vehicle speeds in the candidate lanes and possible travel distances in the lanes may be comprehensively considered (if there is a junction or main/side road ramp in front, the lane leading to a final destination is preferred).

If the current lane changing scene type is the stop-at-end lane changing scene type, namely the D2E is less than a certain numerical value, a lane suitable for stopping needs to be selected as a target lane. This scene type is generally suitable for an L4 autonomous driving system. That is, the vehicle needs to pull over at the end, so the rightmost lane is selected as the first lane under this scene type.

S204: In response to detecting that the first lane satisfies a lane changing safety check condition, control the target vehicle to perform lane changing operation according to the first lane.

Specifically, in response to detecting that the first lane satisfies the lane changing safety check condition, a speed and travel direction of the target vehicle are adjusted to a lane changing speed and a lane changing travel direction, and the target vehicle is controlled to change lane to the first lane according to the lane changing speed and the lane changing travel direction. Lane changing safety check may refer to the descriptions about lane changing safety check in step S103 in the embodiment corresponding to FIG. 3, and will not be elaborated herein.

Through the method provided in this embodiment of this application, the current lane scene type of the target vehicle may be determined according to the acquired scene information of the target vehicle, and then different lane changing operation is performed on the target vehicle according to different current lane changing scene types. Therefore, an autonomous vehicle may change lanes flexibly to avoid traffic congestion better and increase the travel speed.

Figure 7:
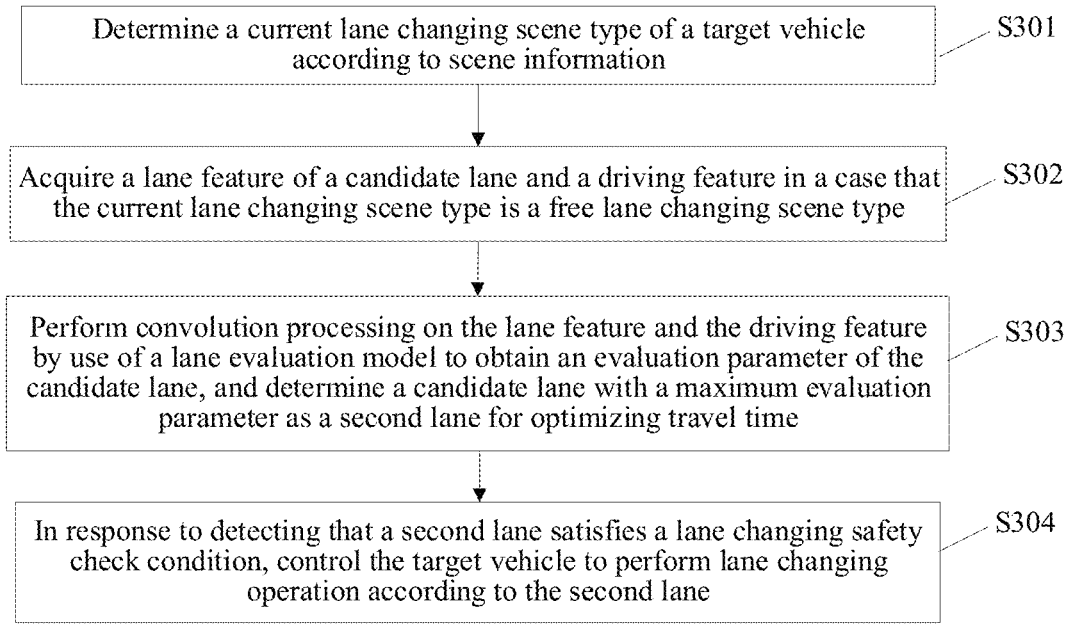
FIG. 7 is a schematic flowchart of free lane changing according to an embodiment of this application.

Further, referring to FIG. 7, FIG. 7 is a schematic flowchart of free lane changing according to an embodiment of this application. As shown in FIG. 7, the process may include the following steps:

S301: Determine a current lane changing scene type of a target vehicle according to scene information.

A specific implementation of step S301 may refer to the descriptions about steps S201 to S202 in the embodiment corresponding to FIG. 4, and will not be elaborated herein.

S302: Acquire a lane feature of a candidate lane and a driving feature when the current lane changing scene type is a free lane changing scene type.

Specifically, the free lane changing scene type includes the above-mentioned free overtaking lane changing scene type. If it is determined that the current lane changing scene type of the target vehicle is the free lane changing scene type, it indicates that the target vehicle is currently far from the end as well as a next junction, and there is no obstacle in front end of the target vehicle in a current driving lane. In such case, the target vehicle may reach a target end according to a navigation travel route if continuing running in the current driving lane. However, in order to prevent a low travel speed of the target vehicle and further increase of task completion time of the target vehicle due to a low travel speed of a vehicle in front and ensure a chance to complete a driving task faster, a condition of a candidate lane may be monitored in real time, and a lane where an average speed is higher may be selected as a driving lane. The computer device may determine whether lane changing is needed in a current driving state by a machine learning method. Therefore, the computer device may extract a lane feature of the candidate lane and a driving feature from the scene information, so as to find by reasoning a lane currently theoretically most suitable for running of the target vehicle as a second lane. The candidate lane refers to a lane where the navigation travel route may be completed.

S303: Process the lane feature and the driving feature by use of a lane evaluation model to obtain an evaluation parameter value of the candidate lane.

Figure 8:
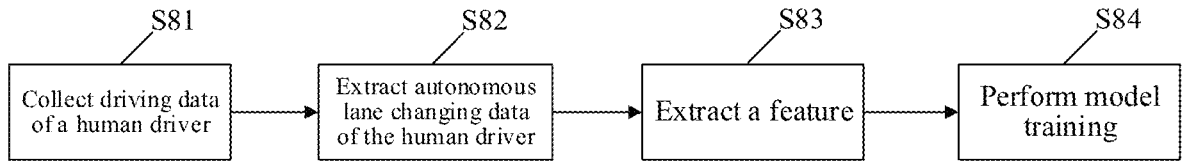
FIG. 8 is a schematic diagram of an offline training process of a lane evaluation model according to an embodiment of this application.

Specifically, the lane evaluation model may be obtained by offline training. For ease of understanding, referring to FIG. 8 together, FIG. 8 is a schematic diagram of an offline training process of a lane evaluation model according to an embodiment of this application. As shown in FIG. 8, the whole training process includes the following steps:

S81: Collect driving data of a human driver.

Specifically, in an offline part, a driving behavior of a human driver and corresponding sensing, positioning, and map information may be acquired by use of an ordinary vehicle installed with a sensor and an information processing system or an autonomous vehicle driven by humans.

S82: Extract autonomous lane changing data of the human driver.

Specifically, a scene of autonomous lane changing by the human driver is selected by use of a data extraction module, and mandatory lane changing data generated for various reasons (for example, the vehicle needs to leave through the ramp, or needs to turn at a crossing) is rejected.

S83: Extract a feature.

Specifically, a lane feature and a driving feature are extracted from the autonomous lane changing data. When the lane feature is extracted, a lane related feature of each candidate lane (such as a current lane, a left lane, and a right lane) may be extracted, such as an average speed in the lane in past 30 s and an average speed in the lane in past 1 minute, a speed limit of the lane, a distance to the end of the lane, and the number of lanes between the lane and an exit lane. The driving feature is extracted, such as last lane changing time, a target lane of last lane changing, a current speed, a duration when the speed is lower than an ideal speed, and a distance to an exit of the road. The above-mentioned features are merely examples, and other features may be selected in practical applications.

S84: Perform model training.

Specifically, the extracted feature and a lane changing intention extracted before form a training sample. The lane evaluation model is trained by use of XGBoost, logistic regression, or a Deep Neural Network (DNN). The machine learning method is not limited in this solution.

After the lane evaluation model is obtained, the computer device processes the lane feature and the driving feature under the free lane changing scene type by use of the lane evaluation model to obtain an evaluation parameter value of the candidate lane, and then determines a candidate lane with a maximum evaluation parameter value as a second lane for optimizing travel time.

S304: Control, in response to detecting that a second lane satisfies a lane changing safety check condition, the target vehicle to perform lane changing operation according to the second lane.

Specifically, under the free lane changing scene type, it is still necessary to perform lane changing safety check mentioned in step S103 in the embodiment corresponding to FIG. 3 on the second lane. The computer device may control the target vehicle to change lane to the second lane only when the second lane satisfies a lane changing safety check condition.

Through the method provided in this embodiment of this application, the current lane scene type of the target vehicle may be determined according to the acquired scene information of the target vehicle, and then different lane changing operation is performed on the target vehicle according to different current lane changing scene types. Therefore, an autonomous vehicle may change lanes flexibly to avoid traffic congestion better and increase the travel speed.

Figure 9:
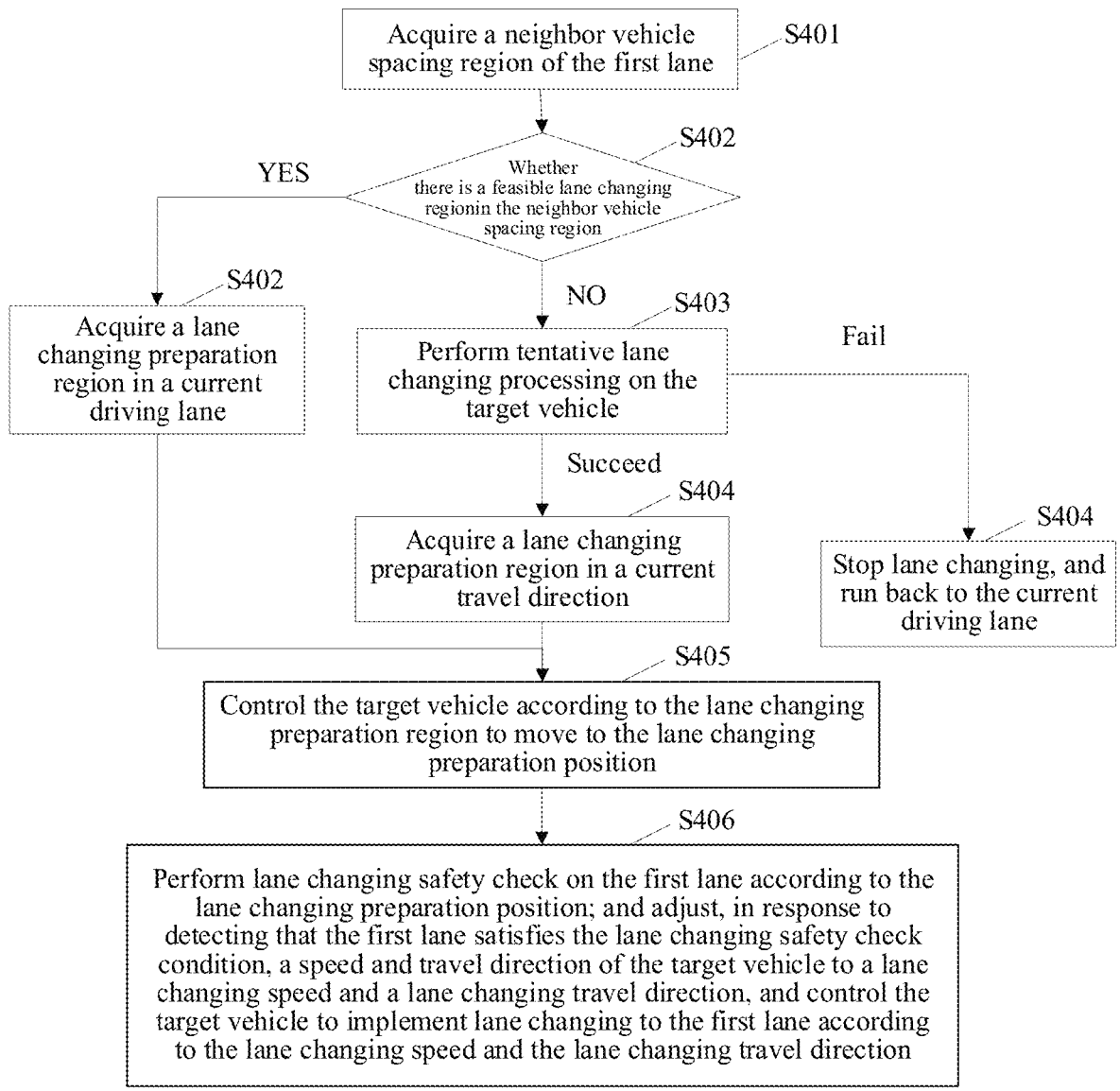
FIG. 9 is a schematic flowchart of mandatory lane changing preparation according to an embodiment of this application.

Further, referring to FIG. 9, FIG. 9 is a schematic flowchart of mandatory lane changing preparation according to an embodiment of this application. Mandatory lane changing preparation may be the detailed description about step S103 in the embodiment corresponding to FIG. 3, and is mainly for describing a process that the target vehicle moves to the lane changing preparation position. The mandatory lane changing preparation process includes the following steps:

S401: Acquire a neighbor vehicle spacing region of the first lane.

Specifically, a specific implementation of step S401 may refer to the descriptions about the acquisition of the neighbor vehicle spacing region of the first lane in step S103 in the embodiment corresponding to FIG. 3, and will not be elaborated herein.

S402: Detect whether there is a feasible lane changing region in the neighbor vehicle spacing region.

Specifically, after the target vehicle changes lane to the first lane, if the distance between the target vehicle and the first vehicle is less than the first safety distance threshold calculated according to formula (1) given in step S103 in the embodiment corresponding to FIG. 3, when the first vehicle has an emergency, it is difficult for the target vehicle to avoid the first vehicle by emergency braking, which is prone to traffic accidents. Therefore, the distance between the target vehicle that moves into the first lane and the first vehicle needs to be greater than the first safety distance threshold. If the distance between the target vehicle and the second vehicle is less than the second safety distance threshold calculated according to formula (2) given in step S103 in the embodiment corresponding to FIG. 3, there is not so much time for a vehicle behind to respond in a case of emergency braking of the target vehicle. Therefore, the distance between the target vehicle that moves into the first lane and the second vehicle needs to be greater than the second safety distance threshold. A position in the feasible lane changing region is at a distance greater than the first safety distance threshold from the first vehicle and at a distance greater than the second safety distance threshold from the second vehicle.

Specifically, determining whether there is a feasible lane changing region in the neighbor vehicle spacing region is implemented by calculating the first safety distance threshold and the second safety distance threshold according to the formulas (1) and (2) and the scene information, and then determining whether there is in the neighbor vehicle spacing region a region at a distance greater than the first safety distance threshold from the first vehicle and at a distance greater than the second safety distance threshold from the second vehicle.

S403: Acquire a lane changing preparation region in a current driving lane when there is a feasible lane changing region in the neighbor vehicle spacing region, and control the target vehicle to move to the lane changing preparation position according to the lane changing preparation region.

Figure 10A:
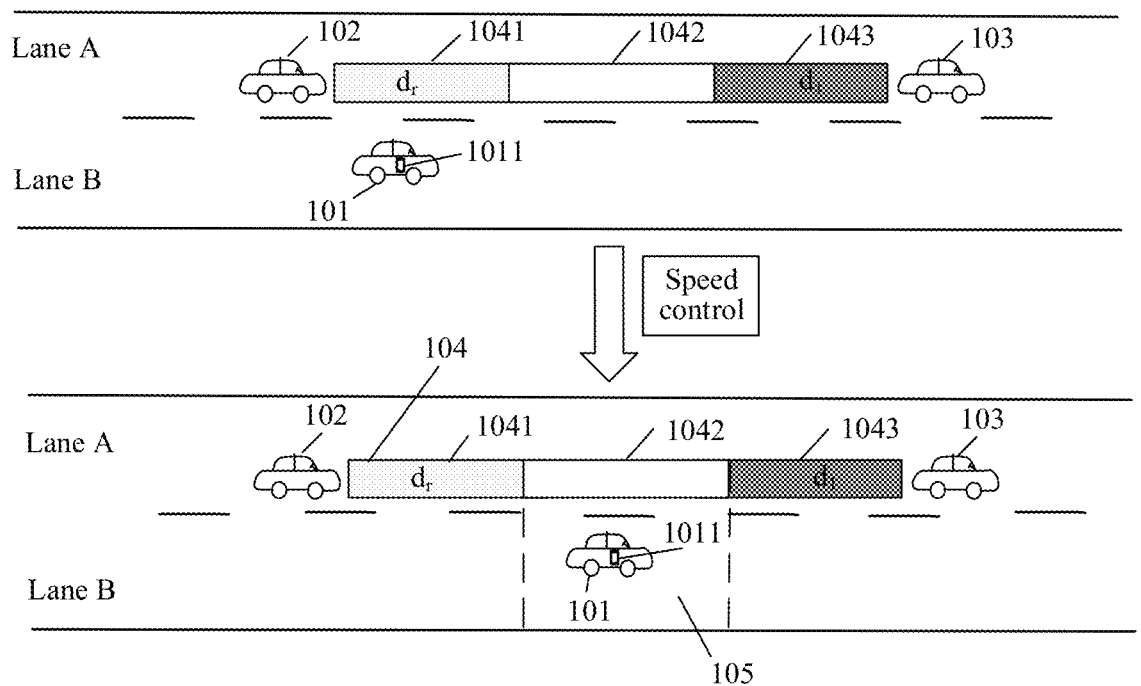
FIGS. 10A to 10B are each a schematic diagram of a mandatory lane changing preparation scenario according to an embodiment of this application.

Specifically, if there is a feasible lane changing region in the neighbor vehicle spacing region, it indicates that the lane changing environment is relatively safe at this point. The computer device may directly acquire a lane changing preparation region in a current driving lane, i.e., a region determined when the feasible lane changing region is translated into the current driving lane, and control the target vehicle to move into the lane changing preparation region. The lane changing preparation region is at a position in the current driving lane corresponding to the feasible lane changing region, and is as long as the feasible lane changing region. For ease of understanding, referring to FIG. 10A together, FIG. 10A is a schematic diagram of a mandatory lane changing preparation scenario according to an embodiment of this application. As shown in FIG. 10A, a target vehicle 101 (which may be the autonomous vehicle 2 in the embodiment corresponding to FIG. 2) runs in lane B. In such case, the computer device determines that a current lane changing scene type is a mandatory lane changing scene type, and determines lane A as a first lane according to the mandatory lane changing scene type. Then, the target vehicle 101 needs to change lane to lane A. First, the computer device may determine a region between a vehicle 102 and a vehicle 103 as a neighbor vehicle spacing region, and then calculate a first safety distance threshold $d_l$ for the target vehicle 101 according to scene information and formula (1). Thus, a region 1043 shown in FIG. 10A is a dangerous region for the target vehicle 101 relative to the vehicle 103. Similarly, the computer device calculates a second safety distance threshold $d_r$ for the target vehicle 101 according to the scene information and formula (2). Thus, a region 1041 shown in FIG. 10A is a dangerous region for the target vehicle 101 relative to the vehicle 102. A partial region in the neighbor vehicle spacing region except the dangerous regions is a feasible lane changing region, i.e., a region 1042. If determining that there is a feasible lane changing region in the neighbor vehicle spacing region, the computer device may control the target vehicle 101 to move into a lane changing preparation region. The lane changing preparation region is a region determined when the feasible lane changing region is translated into a current driving lane. The lane changing preparation region is at a position in the current driving lane corresponding to the feasible lane changing region, and is as long as the feasible lane changing region. When the target vehicle 101 is controlled to move into the lane changing preparation region, speed control may be used, i.e., a policy of uniform acceleration and then uniform deceleration. Assuming that a uniform acceleration and a uniform deceleration are a, a distance between the vehicle and the center of the feasible lane changing region is d, and acceleration time is t, a relationship between a and t may be calculated as follows: $a=d/(2t^2)$. It is only necessary to select a relatively suitable a and t to control the target vehicle 101 to get close to the lane changing preparation region.

S404: Perform tentative lane changing operation on the target vehicle when there is no feasible lane changing region in the neighbor vehicle spacing region; acquire, in response to determining that tentative lane changing succeeds, a lane changing preparation region in a current travel direction, and control the target vehicle to move to the lane changing preparation position according to the lane changing preparation region; and stop, in response to determining that tentative lane changing fails, lane changing, and run back to the current driving lane.

Specifically, if there is no feasible lane changing region in the neighbor vehicle spacing region, it is impossible for the target vehicle to change lane to the first lane. In such case, tentative lane changing operation may be performed on the target vehicle to simulate a squeezing behavior of a user during lane changing to create a safe lane changing environment for lane changing. Tentative lane changing operation includes acquiring a tentative lane changing region for the target vehicle in the current driving lane. The feasible lane changing region refers to a region that satisfies the lane changing safety check condition. The tentative lane changing region is a region determined when a middle region of the neighbor vehicle spacing region is translated into the current driving lane. The tentative lane changing region is at a position in the current driving lane corresponding to the middle region of the neighbor vehicle spacing region, and is as long as the middle region of the neighbor vehicle spacing region. Then, the target vehicle is controlled to move into the tentative lane changing region. When the target vehicle moves into the tentative lane changing region, a tentative lane changing distance and a tentative lane changing time period are acquired, and the target vehicle is controlled to move to the first lane by the tentative lane changing distance. In the tentative lane changing time period, if it is detected that the second vehicle is braked, the target vehicle is controlled to continue moving to the first lane by the tentative lane changing distance. If it is detected that there is a feasible lane changing region in the neighbor vehicle spacing region after tentative movement of the target vehicle, a lane changing preparation region for the target vehicle in a current travel direction is acquired, and the target vehicle is controlled to move to the lane changing preparation position according to the lane changing preparation region. The lane changing preparation region is a region determined when the feasible lane changing region is translated into the current travel direction. The lane changing preparation region is at a position in the current driving lane corresponding to the feasible lane changing region, and is as long as the feasible lane changing region. The lane changing preparation position in the lane changing preparation region satisfies a lane changing condition. A specific implementation of controlling the target vehicle to move to the lane changing preparation position according to the lane changing preparation region may refer to step S402, and will not be elaborated herein.

Figure 10B:
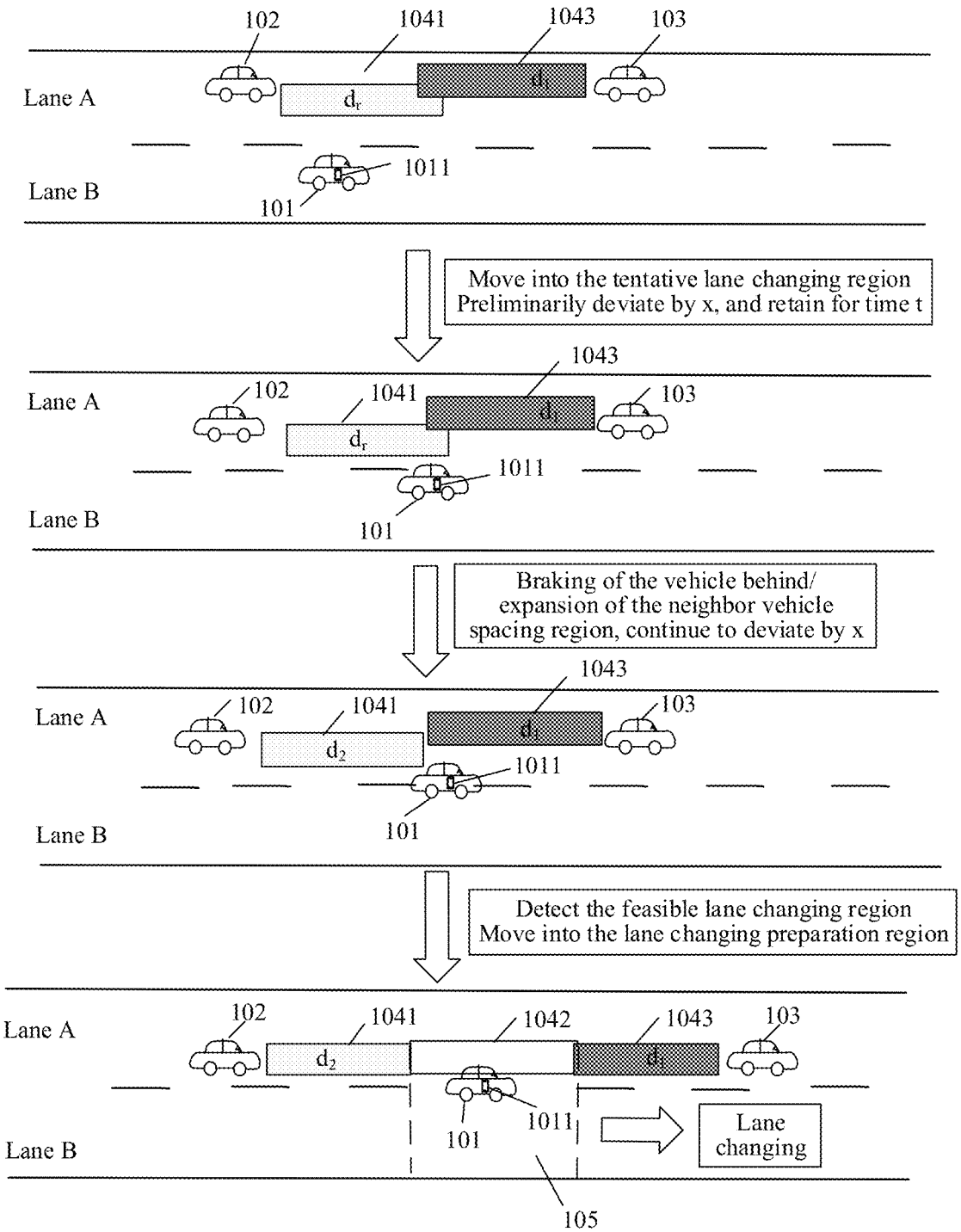

Specifically, for ease of understanding, referring to FIG. 10B together, FIG. 10B is a schematic diagram of another mandatory lane changing preparation scenario according to an embodiment of this application. Specifically, as shown in FIG. 10B, a target vehicle 101 runs in lane B, there is no feasible lane changing region in a neighbor vehicle spacing region in lane A, and a region 1041 and a region 1043 overlap partially. In such case, the target vehicle 101 is not allowed to perform lane changing. Therefore, speed control may be performed on the target vehicle 101 for movement to a middle region in lane B relative to the neighbor vehicle spacing region. Then, a tentative lane changing distance x and a tentative lane changing time period t are acquired. The tentative lane changing distance is a tentative movement distance of the target vehicle to a first lane when there is no feasible lane changing region in the neighbor vehicle spacing region. The tentative lane changing time period is retaining time of the target vehicle after each movement to the first lane by the tentative lane changing distance. Both the tentative lane changing distance and the tentative lane changing time period may be obtained by a tentative lane changing model. Before the target vehicle 101 starts, driving behavior samples may be collected offline to train the tentative lane changing model. The driving behavior samples refer to lane feature samples and driving feature samples during tentative lane changing of a user. Then, when the target vehicle 101 is prepared for tentative lane changing, a current tentative lane changing driving feature and tentative lane changing lane feature are acquired and processed according to the tentative lane changing model to obtain the tentative lane changing distance x and the tentative lane changing time period t. The tentative lane changing driving feature includes a driving feature of the target vehicle during tentative lane changing. The tentative lane changing lane feature includes a lane feature of a candidate lane during tentative lane changing. In the tentative lane changing time period t, a speed of a vehicle 102 is monitored all the time. If braking and speed reduction of the vehicle 102 or expansion of the neighbor vehicle spacing region is detected, for example, as shown in FIG. 10B, the region 1041 and the region 1043 overlap less and gradually get far from each other, it indicates that the vehicle 102 allows lane changing of the target vehicle 101 to lane A. In such case, the target vehicle is controlled to continue to be deviated by the tentative lane changing distance x. When there is a feasible lane changing region 1042 between the region 1041 and the region 1043, the target vehicle is controlled to move into a lane changing preparation region 105. If it is not detected that the vehicle 102 is braked in the tentative lane changing time period t, it is determined that the vehicle 102 does not allow cut-in of the target vehicle to the first lane, and the computer device may determine that tentative lane changing fails, and control the target vehicle 101 to run back to lane B.

S405: Perform lane changing safety check on the first vehicle according to the lane changing preparation position; and adjust, in response to detecting that the first lane satisfies the lane changing safety check condition, a speed and travel direction of the target vehicle to a lane changing speed and a lane changing travel direction, and control the target vehicle to change lane to the first lane according to the lane changing speed and the lane changing travel direction.

Specifically, a specific implementation of step S405 may refer to the descriptions about lane changing safety check in step S103 in the embodiment corresponding to FIG. 3, and will not be elaborated herein.

It can be understood that lane changing safety check is not limited to be performed after the target vehicle moves to the lane changing preparation position. The computer device, after determining the first lane according to the scene information, may keep performing lane changing safety check on the target vehicle until the target vehicle completes lane changing. In the meantime, the computer device, if determining that lane changing safety check fails, may transmit a new control command to control the target vehicle to run back to the current driving lane.

In some embodiments, for lane changing of the target vehicle to the second lane under the free lane changing scene type in the embodiment corresponding to FIG. 7, the computer device may determine whether to perform lane changing according to an output result of the lane evaluation model. The lane evaluation model may further include a safety feature. The safety feature refers to safety information about a lane changing environment of the second lane, such as a lane changing safety check result. The lane evaluation model may comprehensively consider the lane feature, the driving feature, and the safety feature. When there is a feasible lane changing region in the second lane, the target vehicle is controlled to move into the lane changing preparation region and then change lane to the second lane. A specific implementation of controlling the target vehicle to move into the lane changing preparation region is the same as that in step S402, and will not be elaborated herein.

Through the method provided in this embodiment of this application, the current lane scene type of the target vehicle may be determined according to the acquired scene information of the target vehicle, and then different lane changing operation is performed on the target vehicle according to different current lane changing scene types. Therefore, an autonomous vehicle may change lanes flexibly to avoid traffic congestion better and increase the travel speed. Moreover, tentative lane changing may improve the success rate of lane changing while ensuring the lane changing safety.

Figure 11:
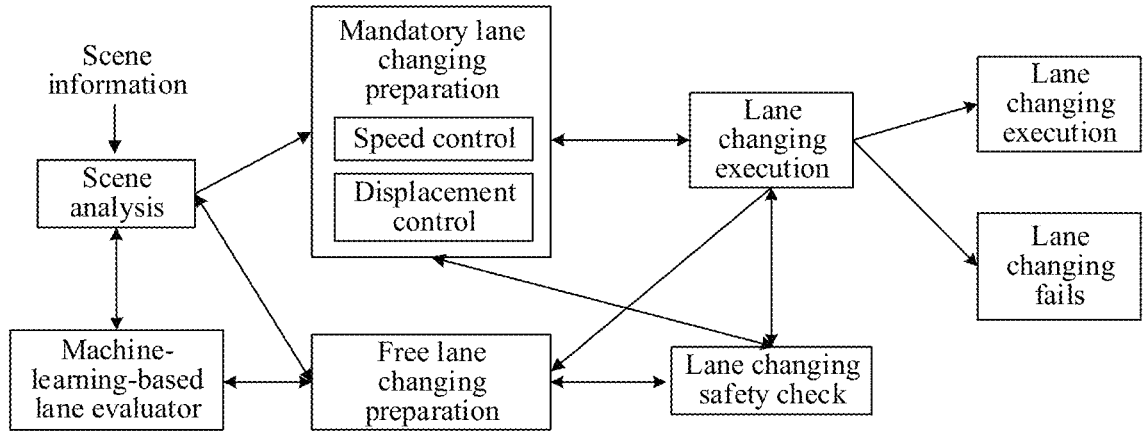
FIG. 11 is a schematic flowchart of autonomous lane changing according to an embodiment of this application.

Further, referring to FIG. 11, FIG. 11 is a schematic flowchart of autonomous lane changing according to an embodiment of this application. As shown in FIG. 11, when a target vehicle starts an autonomous driving task, a corresponding vehicle-mounted terminal may collect scene information in real time, and a computer device may keep analyzing a scene of the target vehicle according to the acquired scene information. A specific implementation of collecting the scene information to analyze the scene of the target vehicle may refer to steps S201 to S202 in the embodiment corresponding to FIG. 4, and will not be elaborated herein. Different lane changing preparation manners may be used according to subdivision of the scene, such that the target vehicle changes lanes more flexibly and efficiently.

If it is determined that the target vehicle is in a mandatory lane changing scene type, a target lane for completing a navigation travel route may be selected for the target vehicle according to features in this scene. A specific implementation may refer to step S203 in the embodiment corresponding to FIG. 4, and will not be elaborated herein. In order to improve the feasibility and success rate of lane changing of the target vehicle in the mandatory lane changing scene type, mandatory lane changing preparations may be made for the target vehicle. That is, speed control, displacement control, etc., may be performed to control the target vehicle to move into a lane changing preparation region. A specific implementation may refer to the descriptions about steps S401 to S404 in the embodiment corresponding to FIG. 9, and will not be elaborated herein.

If it is determined that the target vehicle is in a free lane changing scene type, the computer device may call a lane evaluation model to perform reasoning on the scene information collected in real time by use of the lane evaluation model according to a fixed frequency, and determine whether to perform lane changing according to a reasoning result. If lane changing is determined to be performed, a target lane is determined according to the reasoning result. Then, the target vehicle is controlled to move into a lane changing preparation region. A specific implementation may refer to the descriptions about steps S302 to S304 in the embodiment corresponding to FIG. 7, and will not be elaborated herein.

After the target vehicle moves into the lane changing preparation region, the computer device may acquire scene information when the target vehicle is at a lane changing preparation position in the lane changing preparation region, and then determine whether the target vehicle satisfies a lane changing safety check condition (i.e., the lane changing safety check condition in step S103 in the embodiment corresponding to FIG. 3). If determining that the target vehicle passes lane changing safety check, the computer device may control the target vehicle to start lane changing. As shown in FIG. 11, from the beginning to end of lane changing of the target vehicle, the computer device may keep performing lane changing safety check on the target vehicle and the target lane. If the computer device determines that lane changing safety check fails during execution of lane changing, the target vehicle may stop lane changing immediately and run back to an original driving lane.

Figure 12A:
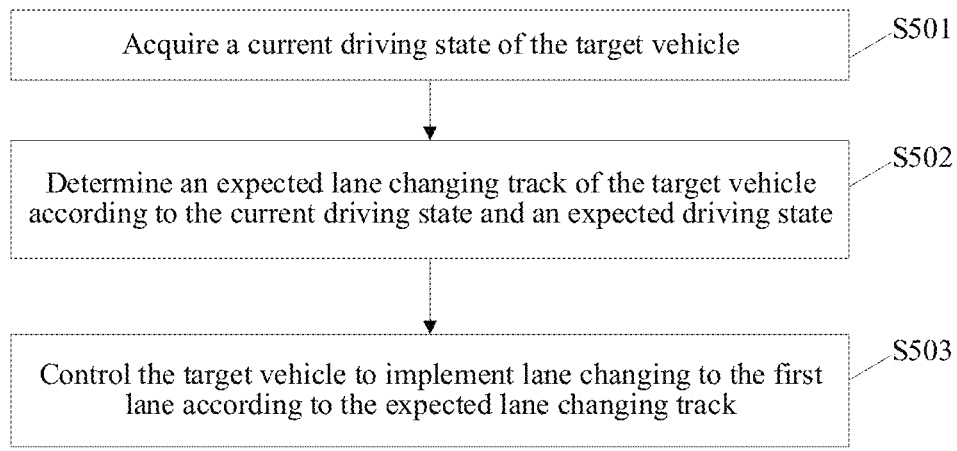
FIG. 12A is a schematic flowchart of a lane changing execution method according to an embodiment of this application.

Further, referring to FIG. 12A, FIG. 12A is a schematic flowchart of a lane changing execution method according to an embodiment of this application. Lane changing execution refers to a process that, after the target vehicle moves to the lane changing preparation position, the computer device, when determining that lane changing safety check succeeds, controls the target vehicle to change lane from the current driving lane to the target lane (such as the first lane recognized under the mandatory lane changing scene type, or the second lane recognized under the free lane changing scene type). For the free lane changing scene type and the mandatory lane changing scene type, the target vehicle is determined in different manners, preparations for lane changing are also different, but lane changing may be performed in the same manner, namely by the lane changing execution method shown in FIG. 12A. FIG. 12A specifically takes lane changing to the first lane as an example. The lane changing execution method includes the following steps:

S501: Acquire a current driving state of the target vehicle.

Specifically, the current driving state includes a current lateral deviation between the target vehicle and the first lane, a current travel distance of the target vehicle, a current angular deviation between the target vehicle and the first lane, and a current angular speed of the target vehicle.

S502: Determine an expected lane changing trajectory of the target vehicle according to the current driving state and an expected driving state.

Specifically, the expected driving state refers to an ideal driving state, including an expected lateral deviation, an expected travel distance, an expected angular deviation, and an expected angular speed, which may be preset.

Figure 12B:
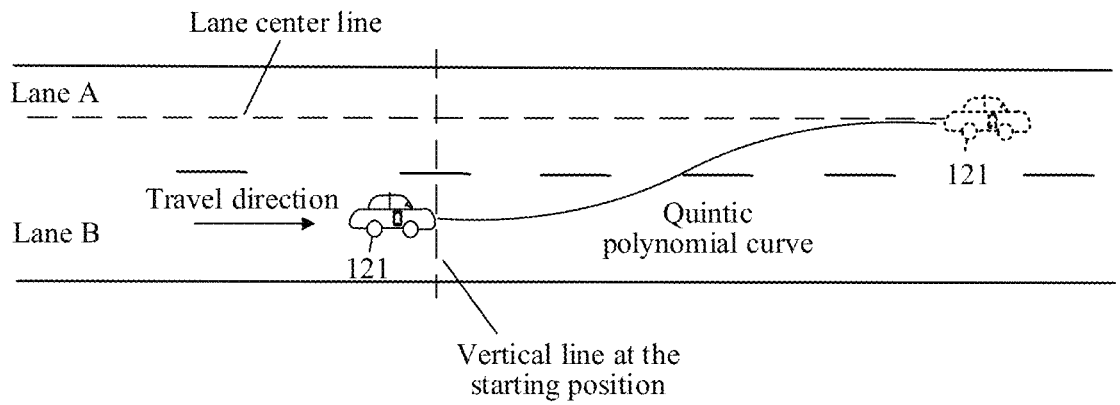
FIG. 12B is a schematic diagram of an expected lane changing trajectory according to an embodiment of this application.

For ease of understanding, referring to FIG. 12B together, FIG. 12B is a schematic diagram of an expected lane changing trajectory according to an embodiment of this application. The computer device may control the target vehicle to perform lane changing according to the expected lane changing trajectory shown in FIG. 12B. The expected lane changing trajectory shown in FIG. 12B may be a quintic polynomial curve, which may be shown as formula (4):

$$l = a_0 s^5 + a_1 s^4 + a_2 s^3 + a_3 s^2 + a_4 s + a_5 \qquad \text{Formula (4)},$$

where s represents a travel distance along the road, and l represents a lateral deviation relative to a target road.

As shown in FIG. 12B, a target vehicle 121 runs in lane B, and lane A is a target lane of lane changing of the target vehicle. In such case, s refers to a vertical distance between the target vehicle 121 and a vertical line at a starting position of the target vehicle 121, and l refers to a vertical distance between the target vehicle 121 and a lane center line of lane A. In order to use the quintic polynomial curve better for lane changing, it is necessary to select suitable quintic polynomial parameters a0 to a5. A first-order derivative of the quintic polynomial may be calculated to obtain formula (5):

$$\theta=5a0s4+4a1s3+3a2s2+2a3s1+a4 \quad \text{Formula (5),}$$

where θ represents an angular deviation, referring to an included angle between a travel direction of the target vehicle 121 and a lane center line of a target lane, and s still represents the travel distance along the road.

A second-order derivative of the quintic polynomial may be calculated to obtain formula (6):

$$w=20a0s3+12A1s2+6A2s+2a3 \quad \text{Formula (6),}$$

where ω represents an angular speed of the target vehicle 121, and s still represents the travel distance along the road.

Calculation of the quintic polynomial may be implemented according to a current driving state of the target vehicle 121 at the beginning of lane changing and a preset driving state. The current driving state of the target vehicle 121 includes a current lateral deviation between the target vehicle 121 and the target lane, a current travel distance of the target vehicle 121, a current angular deviation between a travel direction of the target vehicle 121 and the target lane, and a current angular speed of the target vehicle 121. The preset driving state of the target vehicle 121 is a preset ideal state. For example, it may be set that a preset angular deviation between the travel direction of the target vehicle 121 and the target lane is 0, a preset angular speed of the target vehicle 121 is 0, a preset lateral deviation between the target vehicle 121 and the target vehicle is 0, and a preset travel distance of the target vehicle 121 is a travel distance threshold. Five unknown parameters a0 to a5 may be calculated according to the current driving state and preset driving state of the target vehicle 121 and formulas (4) to (6), so as to obtain an expected lane changing trajectory of a quintic polynomial starting with a position where the vehicle starts lane changing.

S503: Control the target vehicle to change lane to the first lane according to the expected lane changing trajectory.

Specifically, the computer device determines a lane changing speed and a lane changing travel direction according to the expected lane changing trajectory, adjusts the speed and travel direction of the target vehicle to the lane changing speed and the lane changing travel direction, and controls the target vehicle to change lane to the first lane according to the lane changing speed and the lane changing travel direction.

Through the method provided in this embodiment of this application, the current lane scene type of the target vehicle may be determined according to the acquired scene information of the target vehicle, and then different lane changing operation is performed on the target vehicle according to different current lane changing scene types. Therefore, an autonomous vehicle may change lanes flexibly to avoid traffic congestion better and increase the travel speed.

Figure 13:
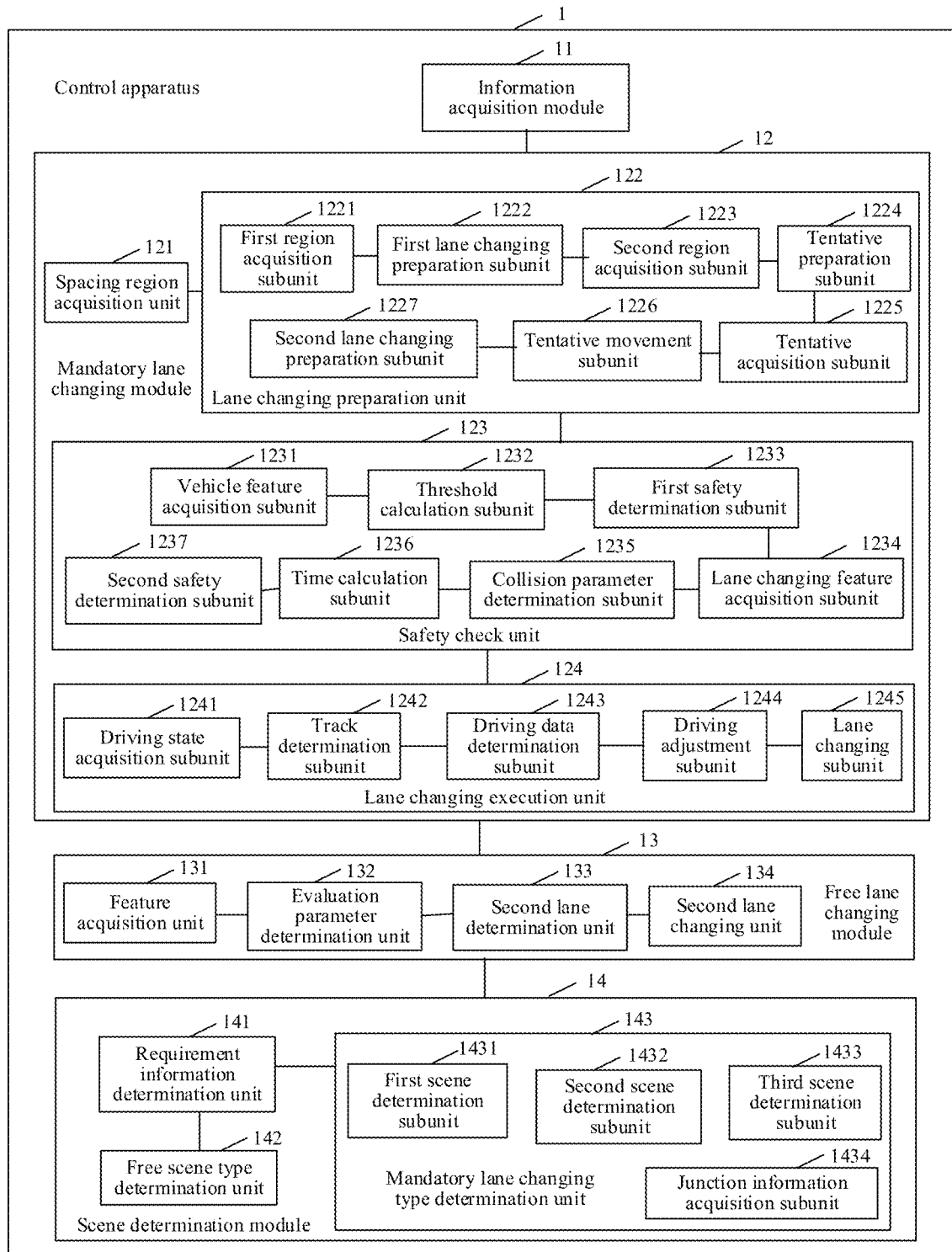
FIG. 13 is a schematic structural diagram of an autonomous-driving-based control apparatus according to an embodiment of this application.

Further, referring to FIG. 13, FIG. 13 is a schematic structural diagram of an autonomous-driving-based control apparatus according to an embodiment of this application.

The control apparatus may be a computer program (including program code) running in a computer device. For example, the control apparatus is application software. The apparatus may be configured to perform the corresponding steps in the method provided in the embodiments of this application. As shown in FIG. 13, the control apparatus 1 may include: an information acquisition module 11, a scene determination module 12, a mandatory lane changing module 13, and a free lane changing module 14.

The information acquisition module 11 is configured to acquire scene information of a target vehicle.

The scene determination module 12 is configured to determine a current lane changing scene type of the target vehicle according to the scene information.

The mandatory lane changing module 13 is configured to recognize, according to the scene information when the current lane changing scene type is a mandatory lane changing scene type, a first lane for completing a navigation travel route, and control, in response to detecting that the first lane satisfies a lane changing safety check condition, the target vehicle according to the first lane to perform lane changing operation.

The free lane changing module 14 is configured to recognize, according to the scene information when the current lane changing scene type is a free lane changing scene type, a second lane for optimizing travel time, and control, in response to detecting that the second lane satisfies the lane changing safety check condition, the target vehicle according to the second lane to perform lane changing operation.

Specific function implementations of the information acquisition module 11, the scene determination module 12, the mandatory lane changing module 13, and the free lane changing module 14 may refer to the descriptions about steps S101 to S104 in the embodiment corresponding to FIG. 3, and will not be elaborated herein.

Referring to FIG. 13, the mandatory lane changing module 12 may include: a spacing region acquisition unit 121, a lane changing preparation unit 122, a safety check unit 123, and a lane changing execution unit 124.

The spacing region acquisition unit 121 is configured to acquire a neighbor vehicle spacing region of a target lane, the neighbor vehicle spacing region being a spacing region between a first vehicle and a second vehicle in the first lane, the first vehicle being a vehicle closest to a front end of the target vehicle in the first lane, and the second vehicle being a vehicle closest to a rear end of the target vehicle in the first lane.

The lane changing preparation unit 122 is configured to control the target vehicle to move to a lane changing preparation position according to the neighbor vehicle spacing region.

The safety check unit 123 is configured to perform lane changing safety check on the first vehicle according to the lane changing preparation position.

The lane changing execution unit 124 is configured to adjust, in response to detecting that the first lane satisfies the lane changing safety check condition, a speed and travel direction of the target vehicle to a lane changing speed and a lane changing travel direction, and control the target vehicle to change lane to the first lane according to the lane changing speed and the lane changing travel direction.

The spacing region acquisition unit 121, the lane changing preparation unit 122, the safety check unit 123, and the lane changing execution unit 124 may refer to the descriptions about step S103 in the embodiment corresponding to FIG. 3, and will not be elaborated herein.

Referring to FIG. 13, the lane changing preparation module 122 may include: a first region acquisition subunit 1221, a first lane changing preparation subunit 1222, a tentative acquisition subunit 1224, a tentative acquisition subunit 1225, a tentative movement subunit 1226, and a second lane changing preparation subunit 1227.

The first region acquisition subunit 1221 is configured to acquire a lane changing preparation region for the target vehicle in a current driving lane when there is a feasible lane changing region in the neighbor vehicle spacing region, the feasible lane changing region referring to a region that satisfies the lane changing safety check condition, and the lane changing preparation region being a region determined when the feasible lane changing region is translated into the current driving lane.

The first lane changing preparation subunit 1222 is configured to control the target vehicle to move to the lane changing preparation position according to the lane changing preparation region.

The second region acquisition subunit 1223 is configured to acquire a tentative lane changing region for the target vehicle in a current driving lane when there is no feasible lane changing region in the neighbor vehicle spacing region, the feasible lane changing region referring to a region that satisfies the lane changing safety check condition, and the tentative lane changing region being a region determined when a middle region of the neighbor vehicle spacing region is translated into the current driving lane.

The tentative preparation subunit 1224 is configured to control the target vehicle to move into the tentative lane changing region.

The tentative acquisition subunit 1225 is configured to determine a lane changing trying distance and a tentative lane changing time period when the target vehicle moves into the tentative lane changing region.

The tentative movement subunit 1226 is configured to control the target vehicle to move to the first lane by the tentative lane changing distance.

The tentative movement subunit is configured to control, in the tentative lane changing time period in response to detecting that the second vehicle is braked, the target vehicle to continue moving to the first lane by the tentative lane changing distance.

The second lane changing preparation subunit 1227 is configured to acquire a lane changing preparation region for the target vehicle in a current travel direction in response to detecting that there is a feasible lane changing region in the neighbor vehicle spacing region after tentative movement of the target vehicle, and control the target vehicle to move to the lane changing preparation position according to the lane changing preparation region, the lane changing preparation region being a region determined when the feasible lane changing region is translated to the current travel direction.

The tentative acquisition subunit is further configured to extract a tentative lane changing driving feature and a tentative lane changing lane feature from the scene information, and process the tentative lane changing driving feature and the tentative lane changing lane feature by use of a tentative lane changing model to obtain the tentative lane changing distance and the tentative lane changing time period, the tentative lane changing model being obtained by training according to driving behavior samples, and the driving behavior samples referring to lane feature samples and driving feature samples during tentative lane changing of a user.

Specific implementations of the first region acquisition subunit 1221, the first lane changing preparation subunit 1222, the tentative preparation subunit 1224, the tentative acquisition subunit 1225, the tentative movement subunit 1226, and the second lane changing preparation subunit 1227 may refer to the descriptions about steps S402 to S404 in the embodiment corresponding to FIG. 9, and will not be elaborated herein.

Referring to FIG. 13, the safety check unit 123 may include: a vehicle feature acquisition subunit 1231, a threshold calculation subunit 1232, a first safety determination subunit 1233, a lane changing feature acquisition subunit 1234, a collision parameter determination subunit 1235, a time calculation subunit 1236, and a second safety determination subunit 1237.

The vehicle feature acquisition subunit 1231 is configured to acquire response time of the target vehicle and a current speed and current acceleration of the target vehicle at the lane changing preparation position.

The vehicle feature acquisition subunit 1231 is further configured to acquire a first speed and first acceleration of the first vehicle.

The vehicle feature acquisition subunit 1231 is further configured to acquire a second speed and second acceleration of the second vehicle.

The threshold calculation subunit 1232 is configured to determine a first safety distance threshold according to the response time, the current speed, the current acceleration, the first speed, and the first acceleration.

The threshold calculation subunit 1232 is further configured to determine a second safety distance threshold according to the response time, the current speed, the current acceleration, the second speed, and the second acceleration.

The first safety determination subunit 1233 is configured to determine, when a front vehicle distance is not less than the first safety distance threshold and a rear vehicle distance is not less than the second safety distance threshold, that the first lane satisfies the lane safety check condition, the front vehicle distance being a distance between the target vehicle at the lane changing preparation position and the first vehicle, and the rear vehicle distance being a distance between the target vehicle at the lane changing preparation position and the second vehicle.

The first safety determination subunit 1233 is further configured to determine, when the front vehicle distance is less than the first safety distance threshold or the rear vehicle distance is less than the second safety distance threshold, that the first lane does not satisfy the lane safety check condition, and control the target vehicle to stop lane changing to the first lane.

The lane changing feature acquisition subunit 1234 is configured to acquire scene update information of the target vehicle at the lane changing preparation position, and acquire a lane changing feature from the scene update information.

The collision parameter determination subunit 1235 is configured to input the lane changing feature to a TTC recognition model, and output expected front vehicle TTC and expected rear vehicle TTC by use of the TTC recognition model.

The time calculation subunit 1236 is configured to determine actual TTC of the target vehicle according to a front vehicle distance and the current speed.

The time calculation subunit 1236 is further configured to determine actual TTC of the second vehicle according to a rear vehicle distance and the second speed.

The second safety determination subunit 1237 is configured to determine, when the actual TTC of the target vehicle is not less than the expected front vehicle TTC and the actual TTC of the second vehicle is not less than the expected rear vehicle TTC, that the first lane satisfies the lane changing safety check condition.

The second safety determination subunit 1237 is further configured to determine, when the actual TTC of the target vehicle is less than the expected front vehicle TTC or the actual TTC of the second vehicle is less than the expected rear vehicle TTC, that the first lane does not satisfy the lane safety check condition, and control the target vehicle to stop lane changing to the first lane.

Specific implementations of the vehicle feature acquisition subunit 1231, the threshold calculation subunit 1232, the first safety determination subunit 1233, the lane changing feature acquisition subunit 1234, the collision parameter determination subunit 1235, the time calculation subunit 1236, and the second safety determination subunit 1237 may refer to the descriptions about lane changing safety check in step S103 in the embodiment corresponding to FIG. 3, and will not be elaborated herein.

Referring to FIG. 13, the lane changing execution module 124 may include: a driving state acquisition subunit 1241, a trajectory determination subunit 1242, a driving data determination subunit 1243, a driving adjustment subunit 1244, and a lane changing subunit 1245.

The driving state acquisition subunit 1241 is configured to acquire a current driving state of the target vehicle, the current driving state including a current lateral deviation between the target vehicle and the first lane, a current travel distance of the target vehicle, a current angular deviation between the target vehicle and the first lane, and a current angular speed of the target vehicle.

The trajectory determination subunit 1242 is configured to determine an expected lane changing trajectory of the target vehicle according to the current lateral deviation, the current travel distance, the current angular deviation, the current angular speed, and an expected driving state.

The driving data determination subunit 1243 is configured to determine the lane changing speed and the lane changing travel direction according to the expected lane changing trajectory.

The driving adjustment subunit 1244 is configured to adjust the speed and travel direction of the target vehicle to the lane changing speed and the lane changing travel direction.

The lane changing subunit 1245 is configured to control the target vehicle to change the lane to the first lane according to the lane changing speed and the lane changing travel direction.

Specific implementations of the driving state acquisition subunit 1241, the trajectory determination subunit 1242, the driving data determination subunit 1243, the driving adjustment subunit 1244, and the lane changing subunit 1245 may refer to the descriptions about steps S501 to S503 in FIG. 12A, and will not be elaborated herein.

Referring to FIG. 13, the free lane changing module 13 may include: a feature acquisition unit 131, an evaluation parameter determination unit 132, a second lane determination unit 133, and a second lane changing unit 134.

The feature acquisition unit 131 is configured to extract a lane feature of a candidate lane and a driving feature from the scene information when the current lane changing scene type is the free lane changing scene type.

The evaluation parameter determination unit 132 is configured to process the lane feature and the driving feature by use of a lane evaluation model to obtain an evaluation parameter value of the candidate lane, the lane evaluation model being obtained by training according to driving behavior samples, and the driving behavior samples referring to lane feature samples and driving feature samples during active lane changing of a user.

The second lane determination unit 133 is configured to determine a candidate lane with a maximum evaluated parameter value as the second lane for optimizing the travel time.

The second lane changing unit 134 is configured to control, in response to detecting that the second lane satisfies the lane changing safety check condition, the target vehicle according to the second lane to perform lane changing operation.

Specific implementations of the feature acquisition unit 131, the evaluation parameter determination unit 132, the second lane determination unit 133, and the second lane changing unit 134 may refer to the descriptions about steps S301 to S304 in the embodiment corresponding to FIG. 7, and will not be elaborated herein.

Referring to FIG. 13, the scene determination module 14 may include: a requirement information determination unit 141, a free scene type determination unit 142, and a mandatory scene type determination unit 143.

The requirement information determination unit 141 is configured to determine obstacle detection information, a D2E, and a D2J according to the scene information.

The free scene type determination unit 142 is configured to determine, when the obstacle detection information indicates that there is no obstacle in front end of the target vehicle, the D2E is not less than a first distance threshold, and the D2J is not less than a second distance threshold, that the current lane changing scene type of the target vehicle is the free lane changing scene type.

The mandatory scene type determination unit 143 is configured to determine, when the obstacle detection information indicates that there is an obstacle in front end of the target vehicle, or the D2E is less than the first distance threshold, or the D2J is less than the second distance threshold, that the current lane changing scene type of the target vehicle is the mandatory lane changing scene type.

Specific implementations of the requirement information determination unit 141, the free scene type determination unit 142, and the mandatory scene type determination unit 143 may refer to the descriptions about steps S201 to S202 in the embodiment corresponding to FIG. 4, and will not be elaborated herein.

The mandatory lane changing scene type includes a junction lane changing scene type, an exit lane changing scene type, a static obstacle lane changing scene type, and a stop-at-end lane changing scene type.

Referring to FIG. 13, the mandatory scene type determination unit 143 may include: a first scene determination subunit 1431, a second scene determination subunit 1432, a junction information acquisition subunit 1433, and a third scene determination subunit 1434.

The first scene determination subunit 1431 is configured to determine, when the obstacle detection information indicates that there is a static obstacle in front end of the target vehicle, that the current lane changing scene type of the target vehicle is the static obstacle lane changing scene type.

The second scene determination subunit 1432 is configured to determine, when the D2E is less than the first distance threshold, that the current lane changing scene type of the target vehicle is the stop-at-end lane changing scene type.

The junction information acquisition subunit 1433 is configured to acquire junction map information of a junction when the D2J is less than the second distance threshold.

The third scene determination subunit 1434 is configured to determine, when the junction map information indicates that the junction is an exit, that the current lane changing scene type of the target vehicle is the exit lane changing scene type, otherwise determine that the current lane changing scene type of the target vehicle is the junction lane changing scene type, the junction lane changing scene type, the exit lane changing scene type, the static obstacle lane changing scene type, and the stop-at-end lane changing scene type being used for determining the first lane.

Specific implementations of the first scene determination subunit 1431, the second scene determination subunit 1432, the junction information acquisition subunit 1433, and the third scene determination subunit 1434 may refer to the descriptions about steps S51 to S54 in the embodiment corresponding to FIG. 5, and will not be elaborated herein.

In this embodiment of this application, the current lane changing scene type of the target vehicle may be determined according to the acquired scene information of the target vehicle. The first lane for completing the navigation travel route may be recognized according to the scene information when the current lane changing scene type is the mandatory lane changing scene type. In response to detecting that the first lane satisfies the lane changing safety check condition, the target vehicle is controlled according to the first lane to perform lane changing operation. The second lane for optimizing the travel time is recognized according to the scene information when the current lane changing scene type is the free lane changing scene type. In response to detecting that the second lane satisfies the lane changing safety check condition, the target vehicle is controlled according to the second lane to perform lane changing operation. Through the method provided in this embodiment of this application, the current lane scene type of the target vehicle may be determined according to the acquired scene information of the target vehicle, and then different lane changing operation is performed on the target vehicle according to different current lane changing scene types. Therefore, an autonomous vehicle may change lanes flexibly to avoid traffic congestion better and increase the travel speed.

Figure 14:
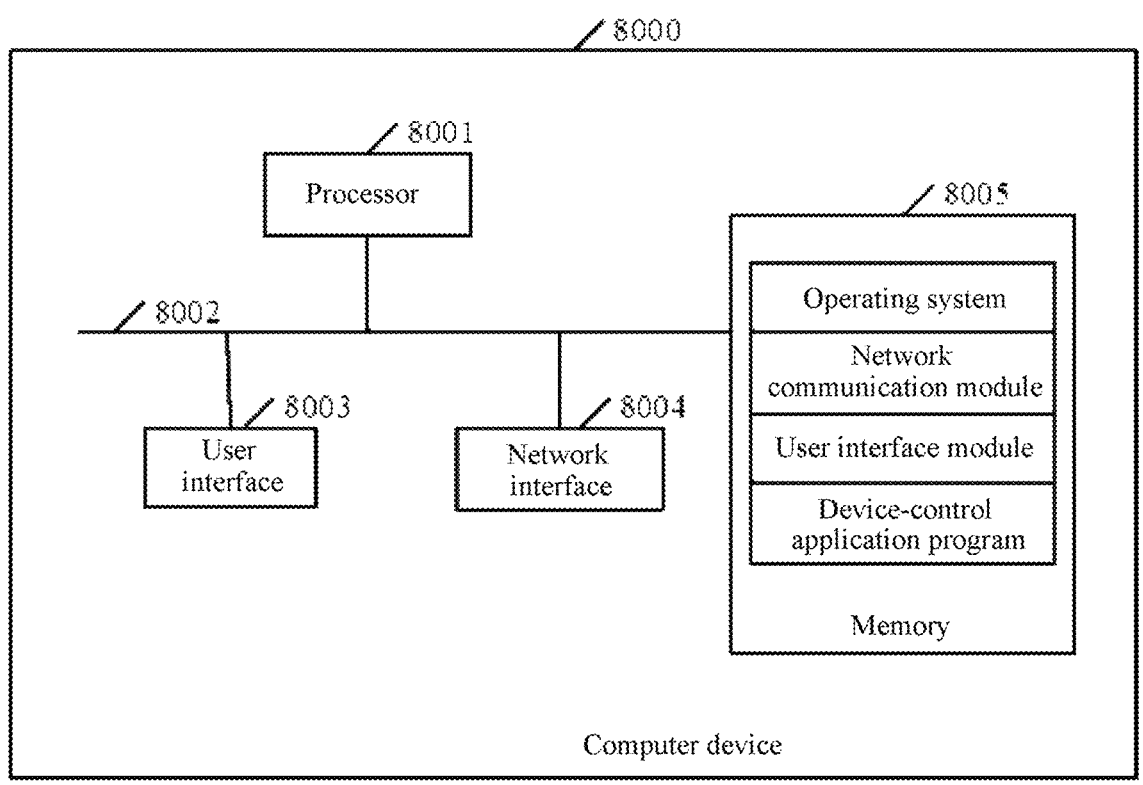
FIG. 14 is a schematic structural diagram of a computer device according to an embodiment of this application.

Further, referring to FIG. 14, FIG. 14 is a schematic structural diagram of a computer device according to an embodiment of this application. As shown in FIG. 14, the apparatus 1 in the embodiment corresponding to FIG. 13 may be applied to the computer device 8000. The computer device 8000 may include: a processor 8001, a network interface 8004, and a memory 8005. In addition, the computer device 8000 further includes: a user interface 8003 and at least one communication bus 8002. The communications bus 8002 is configured to implement connection and communication between the components. The network interface 8004 may include a standard wired interface and a standard wireless interface (such as a Wi-Fi interface). The memory 8005 may be a high-speed RAM memory, or may be a non-volatile memory, for example, at least one magnetic disk memory. The memory 8005 may further be at least one storage apparatus that is located far away from the processor 8001. As shown in FIG. 14, the memory 8005 used as a computer-readable storage medium may include an operating system, a network communication module, a user interface module, and a device-control application program.

In the computer device 8000 shown in FIG. 14, the network interface 8004 may provide a network communication function, the user interface 8003 is mainly configured to provide an input interface for a user, and The processor 8001 may be configured to call the device control application program stored in the memory 8005 to implement the following operations: acquiring scene information of a target vehicle; determining a current lane changing scene type of the target vehicle according to the scene information; recognizing, according to the scene information when the current lane changing scene type is a mandatory lane changing scene type, a first lane for completing a navigation travel route, and controlling, in response to detecting that the first lane satisfies a lane changing safety check condition, the target vehicle according to the first lane to perform lane changing operation; and The second lane for optimizing the travel time is recognized according to the scene information when the current lane changing scene type is the free lane changing scene type. In response to detecting that the second lane satisfies the lane changing safety check condition, the target vehicle is controlled according to the second lane to perform lane changing operation.

It is to be understood that the computer device 8000 described in this embodiment of this application may execute the descriptions about the control method in the embodiments corresponding to FIGS. 3 to 12A, or execute the descriptions about the control apparatus 1 in the embodiment corresponding to FIG. 13. Elaborations are omitted herein. In addition, the description of beneficial effects of the same method will also not be repeated herein.

In addition, the embodiments of this application also provide a computer-readable storage medium. The computer-readable storage medium stores a computer program executed by the data processing computer device 8000 mentioned above. The computer program includes program instructions. The processor, when executing the program instructions, may execute the descriptions about the data processing method in the embodiments corresponding to FIGS. 3 to 12B. Therefore, elaborations are omitted herein. In addition, the description of beneficial effects of the same method will also not be repeated herein. Technical details that are not disclosed in the embodiment of the computer-readable storage medium involved in this application refer to the descriptions in the method embodiments of this application.

The computer-readable storage medium may be an internal storage unit of the data processing apparatus or computer device provided in any one of the above-mentioned embodiments, such as a hard disk or internal memory of the computer device. The computer-readable storage medium may be alternatively an external storage device of the computer device, such as a plug-in hard disk, smart media card (SMC), secure digital (SD) card, or flash card on the computer device. Further, the computer-readable storage medium may alternatively include both an internal storage unit and external storage device of the computer device. The computer-readable storage medium is configured to store the computer program and another program and data that are needed by the computer device. The computer-readable storage medium may further be configured to temporarily store data that has been outputted or is to be output.

In addition, the embodiments of this application also provide a vehicle, including the above-mentioned control apparatus 1 in the embodiment corresponding to FIG. 13, or, including the above-mentioned computer device, or, including the above-mentioned computer-readable storage medium. The vehicle may execute the descriptions about the control method in the embodiments corresponding to FIGS. 3 to 12B, and thus will not be elaborated herein. In addition, the description of beneficial effects of the same method will also not be repeated herein. Technical details that are not disclosed in the vehicle embodiment involved in this application refer to the descriptions in the method embodiments of this application.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of this application, and certainly is not intended to limit the protection scope of this application. Therefore, equivalent variations made in accordance with the claims of this application shall fall within the scope of this application.

What is claimed is:

1. An autonomous-driving-based control method performed by a computer device and comprising:
   acquiring scene information of a target vehicle;
   determining a current lane changing scene type of the target vehicle according to the scene information;
   recognizing, when the current lane changing scene type is a mandatory lane changing scene type, a first lane for completing a navigation travel route, and in response to detecting that the first lane satisfies a lane changing safety check condition, controlling the target vehicle to perform lane changing operation according to the first lane; and
   recognizing, when the current lane changing scene type is a free lane changing scene type, a second lane for optimizing travel time, and in response to detecting that the second lane satisfies the lane changing safety check condition, the controlling target vehicle to perform lane changing operation according to the second lane.

2. The method according to claim 1, wherein the controlling the target vehicle to perform lane changing operation according to the first lane comprises:
   acquiring a neighbor vehicle spacing region of the first lane, the neighbor vehicle spacing region being a spacing region between a first vehicle and a second vehicle in the first lane, the first vehicle being a vehicle closest to a front end of the target vehicle in the first lane, and the second vehicle being a vehicle closest to a rear end of the target vehicle in the first lane;
   controlling the target vehicle to move to a lane changing preparation position according to the neighbor vehicle spacing region;
   performing lane changing safety check on the first vehicle according to the lane changing preparation position; and
   in response to detecting that the first lane satisfies the lane changing safety check condition, adjusting a speed and travel direction of the target vehicle to a lane changing speed and a lane changing travel direction, and controlling the target vehicle to change lane to the first lane according to the lane changing speed and the lane changing travel direction.

3. The method according to claim 2, wherein the controlling the target vehicle to move to a lane changing preparation position according to the neighbor vehicle spacing region comprises:
   acquiring a lane changing preparation region for the target vehicle in a current driving lane when there is a feasible lane changing region in the neighbor vehicle spacing region; and
   controlling the target vehicle to move to the lane changing preparation position according to the lane changing preparation region, the feasible lane changing region referring to a region that satisfies the lane changing safety check condition, and the lane changing preparation region being a region determined when the feasible lane changing region is translated into the current driving lane.

4. The method according to claim 2, wherein the controlling the target vehicle to move to a lane changing preparation position according to the neighbor vehicle spacing region comprises:
   acquiring a tentative lane changing region for the target vehicle in a current driving lane when there is no feasible lane changing region in the neighbor vehicle spacing region, the feasible lane changing region referring to a region that satisfies the lane changing safety check condition, and the tentative lane changing region being a region determined when a middle region of the neighbor vehicle spacing region is translated into the current driving lane;
   controlling the target vehicle to move into the tentative lane changing region, and determining a tentative lane changing distance and a tentative lane changing time period, the tentative lane changing distance being a tentative movement distance of the target vehicle to the first lane when there is no feasible lane changing region in the neighbor vehicle spacing region, and the tentative lane changing time period being retaining time of the target vehicle after each movement to the first lane by the tentative lane changing distance;
   controlling the target vehicle to move to the first lane by the tentative lane changing distance;
   in response to detecting that the second vehicle is braked, controlling the target vehicle to continue moving to the first lane by the tentative lane changing distance within the tentative lane changing time period; and
   acquiring a lane changing preparation region for the target vehicle in a current travel direction in response to detecting that there is a feasible lane changing region in the neighbor vehicle spacing region after tentative movement of the target vehicle, and controlling the target vehicle to move to the lane changing preparation position according to the lane changing preparation region, the lane changing preparation region being a region determined when the feasible lane changing region is translated to the current travel direction.

5. The method according to claim 4, wherein the acquiring a tentative lane changing distance and a tentative lane changing time period comprises:
   extracting a tentative lane changing driving feature and a tentative lane changing lane feature from the scene information, the tentative lane changing driving feature comprising a driving feature of the target vehicle during a tentative lane changing, and the tentative lane changing lane feature comprising a lane feature of a candidate lane during the tentative lane changing; and
   processing the tentative lane changing driving feature and the tentative lane changing lane feature by use of a tentative lane changing model to obtain the tentative lane changing distance and the tentative lane changing time period, the tentative lane changing model being obtained by training according to driving behavior samples, and the driving behavior samples including lane feature samples and driving feature samples during the tentative lane changing of a user.

6. The method according to claim 2, wherein the performing lane changing safety check on the first vehicle according to the lane changing preparation position comprises:
acquiring a response time of the target vehicle and a current speed and a current acceleration of the target vehicle at the lane changing preparation position;
acquiring a first speed and a first acceleration of the first vehicle;
acquiring a second speed and a second acceleration of the second vehicle;
determining a first safety distance threshold according to the response time, the current speed, the current acceleration, the first speed, and the first acceleration;
determining a second safety distance threshold according to the response time, the current speed, the current acceleration, the second speed, and the second acceleration;
determining, when a front vehicle distance is not less than the first safety distance threshold and a rear vehicle distance is not less than the second safety distance threshold, that the first lane satisfies the lane safety check condition, the front vehicle distance being a distance between the target vehicle at the lane changing preparation position and the first vehicle, and the rear vehicle distance being a distance between the target vehicle at the lane changing preparation position and the second vehicle; and
determining, when the front vehicle distance is less than the first safety distance threshold or the rear vehicle distance is less than the second safety distance threshold, that the first lane does not satisfy the lane safety check condition, and controlling the target vehicle to stop lane changing to the first lane.

7. The method according to claim 2, wherein the performing lane changing safety check on the first vehicle according to the lane changing preparation position comprises:
acquiring scene update information of the target vehicle at the lane changing preparation position, and acquiring a lane changing feature from the scene update information;
inputting the lane changing feature to a time-to-collision recognition model, and outputting expected front vehicle time-to-collision and expected rear vehicle time-to-collision by use of the time-to-collision recognition model;
acquiring a current speed of the target vehicle at the lane changing preparation position and a second speed of the second vehicle;
determining actual time-to-collision of the target vehicle according to a front vehicle distance and the current speed, the front vehicle distance being a distance between the target vehicle at the lane changing preparation position and the first vehicle;
determining actual time-to-collision of the second vehicle according to a rear vehicle distance and the second speed, the rear vehicle distance being a distance between the target vehicle at the lane changing preparation position and the second vehicle;
determining, when the actual time-to-collision of the target vehicle is not less than the expected front vehicle time-to-collision and the actual time-to-collision of the second vehicle is not less than the expected rear vehicle time-to-collision, that the first lane satisfies the lane changing safety check condition; and
determining, when the actual time-to-collision of the target vehicle is less than the expected front vehicle time-to-collision or the actual time-to-collision of the second vehicle is less than the expected rear vehicle time-to-collision, that the first lane does not satisfy the lane safety check condition, and controlling the target vehicle to stop lane changing to the first lane.

8. The method according to claim 2, wherein the adjusting a speed and travel direction of the target vehicle to a lane changing speed and a lane changing travel direction and controlling the target vehicle to change lane to the first lane according to the lane changing speed and the lane changing travel direction comprises:
acquiring a current driving state of the target vehicle, the current driving state comprising a current lateral deviation between the target vehicle and the first lane, a current travel distance of the target vehicle, a current angular deviation between the target vehicle and the first lane, and a current angular speed of the target vehicle;
determining an expected lane changing trajectory of the target vehicle according to the current lateral deviation, the current travel distance, the current angular deviation, the current angular speed, and an expected driving state;
determining the lane changing speed and the lane changing travel direction according to the expected lane changing trajectory;
adjusting the speed and travel direction of the target vehicle to the lane changing speed and the lane changing travel direction; and
controlling the target vehicle to change lane to the first lane according to the lane changing speed and the lane changing travel direction.

9. The method according to claim 1, wherein the recognizing, when the current lane changing scene type is a free lane changing scene type, a second lane for optimizing travel time according to the scene information, and in response to detecting that the second lane satisfies the lane changing safety check condition, controlling the target vehicle to perform lane changing operation according to the second lane comprises:
extracting a lane feature of a candidate lane and a driving feature from the scene information when the current lane changing scene type is the free lane changing scene type;
processing the lane feature and the driving feature by use of a lane evaluation model to obtain an estimated parameter value of the candidate lane, the lane evaluation model being obtained by training according to driving behavior samples, and the driving behavior samples referring to lane feature samples and driving feature samples during active lane changing of a user;
determining a candidate lane with a maximum estimated parameter value as the second lane for optimizing the travel time; and
in response to detecting that the second lane satisfies the lane changing safety check condition, controlling the target vehicle to perform lane changing operation according to the second lane.

10. The method according to claim 1, wherein the determining a current lane changing scene type of the target vehicle according to the scene information comprises:
determining obstacle detection information, a distance to end, and a distance to junction according to the scene information;

determining, when the obstacle detection information indicates that there is no obstacle in front of the target vehicle, the distance to end is not less than a first distance threshold, and the D2J is not less than a second distance threshold, that the current lane changing scene type of the target vehicle is the free lane changing scene type; and determining, when the obstacle detection information indicates that there is an obstacle in front of the target vehicle, or the distance to end is less than the first distance threshold, or the D2J is less than the second distance threshold, that the current lane changing scene type of the target vehicle is the mandatory lane changing scene type.

11. The method according to claim 9, wherein the mandatory lane changing scene type comprises a junction lane changing scene type, an exit lane changing scene type, a static obstacle lane changing scene type, and a stop-at-end lane changing scene type;

the determining, when the obstacle detection information indicates that there is an obstacle in front of the target vehicle, or the distance to end is less than the first distance threshold, or the D2J is less than the second distance threshold, that the current lane changing scene type of the target vehicle is the mandatory lane changing scene type comprises:

determining, when the obstacle detection information indicates that there is a static obstacle in front of the target vehicle, that the current lane changing scene type of the target vehicle is the static obstacle lane changing scene type;

determining, when the distance to end is less than the first distance threshold, that the current lane changing scene type of the target vehicle is the stop-at-end lane changing scene type;

acquiring junction map information of a junction when the D2J is less than the second distance threshold; and determining, when the junction map information indicates that the junction is an exit, that the current lane changing scene type of the target vehicle is the exit lane changing scene type, otherwise determining that the current lane changing scene type of the target vehicle is the junction lane changing scene type, the junction lane changing scene type, the exit lane changing scene type, the static obstacle lane changing scene type, and the stop-at-end lane changing scene type being used for determining the first lane.

12. A computer device, comprising: a processor, a memory, and a network interface, the processor being connected to the memory and the network interface, the network interface being configured to provide a network communication function, the memory being configured to store program code, and the processor being configured to invoke the program code to perform an autonomous-driving-based control method including:

acquiring scene information of a target vehicle;

determining a current lane changing scene type of the target vehicle according to the scene information;

recognizing, when the current lane changing scene type is a mandatory lane changing scene type, a first lane for completing a navigation travel route, and in response to detecting that the first lane satisfies a lane changing safety check condition, controlling the target vehicle to perform lane changing operation according to the first lane; and recognizing, when the current lane changing scene type is a free lane changing scene type, a second lane for optimizing travel time, and in response to detecting that the second lane satisfies the lane changing safety check condition, the controlling target vehicle to perform lane changing operation according to the second lane.

13. The computer device according to claim 12, wherein the controlling the target vehicle to perform lane changing operation according to the first lane comprises:

acquiring a neighbor vehicle spacing region of the first lane, the neighbor vehicle spacing region being a spacing region between a first vehicle and a second vehicle in the first lane, the first vehicle being a vehicle closest to a front end of the target vehicle in the first lane, and the second vehicle being a vehicle closest to a rear end of the target vehicle in the first lane;

controlling the target vehicle to move to a lane changing preparation position according to the neighbor vehicle spacing region;

performing lane changing safety check on the first vehicle according to the lane changing preparation position; and in response to detecting that the first lane satisfies the lane changing safety check condition, adjusting a speed and travel direction of the target vehicle to a lane changing speed and a lane changing travel direction, and controlling the target vehicle to change lane to the first lane according to the lane changing speed and the lane changing travel direction.

14. The computer device according to claim 12, wherein the recognizing, when the current lane changing scene type is a free lane changing scene type, a second lane for optimizing travel time according to the scene information, and in response to detecting that the second lane satisfies the lane changing safety check condition, controlling the target vehicle to perform lane changing operation according to the second lane comprises:

extracting a lane feature of a candidate lane and a driving feature from the scene information when the current lane changing scene type is the free lane changing scene type;

processing the lane feature and the driving feature by use of a lane evaluation model to obtain an estimated parameter value of the candidate lane, the lane evaluation model being obtained by training according to driving behavior samples, and the driving behavior samples referring to lane feature samples and driving feature samples during active lane changing of a user;

determining a candidate lane with a maximum estimated parameter value as the second lane for optimizing the travel time; and in response to detecting that the second lane satisfies the lane changing safety check condition, controlling the target vehicle to perform lane changing operation according to the second lane.

15. The computer device according to claim 12, wherein the determining a current lane changing scene type of the target vehicle according to the scene information comprises:

determining obstacle detection information, a distance to end, and a distance to junction according to the scene information;

determining, when the obstacle detection information indicates that there is no obstacle in front of the target vehicle, the distance to end is not less than a first distance threshold, and the D2J is not less than a second distance threshold, that the current lane changing scene type of the target vehicle is the free lane changing scene type; and determining, when the obstacle detection information indicates that there is an obstacle in front of the target vehicle, or the distance to end is less than the first distance threshold, or the D2J is less than the second distance threshold, that the current lane changing scene type of the target vehicle is the mandatory lane changing scene type.

16. A non-transitory computer-readable storage medium, storing a computer program, the computer program, when executed by a processor of a computer device, causing the computer device to perform an autonomous-driving-based control method including:
   acquiring scene information of a target vehicle;
   determining a current lane changing scene type of the target vehicle according to the scene information;
   recognizing, when the current lane changing scene type is a mandatory lane changing scene type, a first lane for completing a navigation travel route, and in response to detecting that the first lane satisfies a lane changing safety check condition, controlling the target vehicle to perform lane changing operation according to the first lane; and
   recognizing, when the current lane changing scene type is a free lane changing scene type, a second lane for optimizing travel time, and in response to detecting that the second lane satisfies the lane changing safety check condition, the controlling target vehicle to perform lane changing operation according to the second lane.

17. The non-transitory computer-readable storage medium according to claim 16, wherein the controlling the target vehicle to perform lane changing operation according to the first lane comprises:
   acquiring a neighbor vehicle spacing region of the first lane, the neighbor vehicle spacing region being a spacing region between a first vehicle and a second vehicle in the first lane, the first vehicle being a vehicle closest to a front end of the target vehicle in the first lane, and the second vehicle being a vehicle closest to a rear end of the target vehicle in the first lane;
   controlling the target vehicle to move to a lane changing preparation position according to the neighbor vehicle spacing region;
   performing lane changing safety check on the first vehicle according to the lane changing preparation position; and
   in response to detecting that the first lane satisfies the lane changing safety check condition, adjusting a speed and travel direction of the target vehicle to a lane changing speed and a lane changing travel direction, and controlling the target vehicle to change lane to the first lane according to the lane changing speed and the lane changing travel direction.

18. The non-transitory computer-readable storage medium according to claim 16, wherein the recognizing, when the current lane changing scene type is a free lane changing scene type, a second lane for optimizing travel time according to the scene information, and in response to detecting that the second lane satisfies the lane changing safety check condition, controlling the target vehicle to perform lane changing operation according to the second lane comprises:
   extracting a lane feature of a candidate lane and a driving feature from the scene information when the current lane changing scene type is the free lane changing scene type;
   processing the lane feature and the driving feature by use of a lane evaluation model to obtain an estimated parameter value of the candidate lane, the lane evaluation model being obtained by training according to driving behavior samples, and the driving behavior samples referring to lane feature samples and driving feature samples during active lane changing of a user;
   determining a candidate lane with a maximum estimated parameter value as the second lane for optimizing the travel time; and
   in response to detecting that the second lane satisfies the lane changing safety check condition, controlling the target vehicle to perform lane changing operation according to the second lane.

19. The non-transitory computer-readable storage medium according to claim 16, wherein the determining a current lane changing scene type of the target vehicle according to the scene information comprises:
   determining obstacle detection information, a distance to end, and a distance to junction according to the scene information;
   determining, when the obstacle detection information indicates that there is no obstacle in front of the target vehicle, the distance to end is not less than a first distance threshold, and the D2J is not less than a second distance threshold, that the current lane changing scene type of the target vehicle is the free lane changing scene type; and
   determining, when the obstacle detection information indicates that there is an obstacle in front of the target vehicle, or the distance to end is less than the first distance threshold, or the D2J is less than the second distance threshold, that the current lane changing scene type of the target vehicle is the mandatory lane changing scene type.

* * * * *